(12) United States Patent
Omran et al.

(10) Patent No.: US 12,240,768 B1
(45) Date of Patent: Mar. 4, 2025

(54) SULFER-DOPED SILVER TUNGSTATE (AG2WO4) NANOPARTICLES FOR WATER DECONTAMINATION

(71) Applicant: IMAM MOHAMMAD IBN SAUD ISLAMIC UNIVERSITY, Riyadh (SA)

(72) Inventors: Mohamed Khairy Abdel Fattah Omran, Riyadh (SA); Mohamed Mokhtar Mohamed, Benha (EG); Salah Ahmed Ibrahim Eid, Sakaka (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/934,939

(22) Filed: Nov. 1, 2024

(51) Int. Cl.
*C02F 1/28* (2023.01)
*B01J 20/06* (2006.01)
*B01J 20/28* (2006.01)
*B01J 20/30* (2006.01)
(Continued)

(52) U.S. Cl.
CPC ............... *C02F 1/288* (2013.01); *B01J 20/06* (2013.01); *B01J 20/28007* (2013.01); *B01J 20/28019* (2013.01); *B01J 20/3071* (2013.01); *B01J 20/3085* (2013.01); *B01J 20/3433* (2013.01); *B01J 20/3475* (2013.01);
(Continued)

(58) Field of Classification Search
None
See application file for complete search history.

(56) References Cited

U.S. PATENT DOCUMENTS

2021/0086170 A1   3/2021   Isimjan et al.

FOREIGN PATENT DOCUMENTS

CN   104229870 B   3/2016
KR   10-2402079 B1   5/2022
(Continued)

OTHER PUBLICATIONS

El-Kammah, et al., Enhanced removal of Indigo Carmine dye from textile effluent using green cost-efficient nanomaterial: Adsorption, kinetics, thermodynamics and mechanisms, Sustainable Chemistry and Pharmacy, vol. 29, 2022, 100753 (Year: 2022).*
(Continued)

*Primary Examiner* — Chester T Barry
(74) *Attorney, Agent, or Firm* — Oblon, McClelland, Maier & Neustadt, L.L.P.

(57) ABSTRACT

A method of water decontamination includes contacting sulfur-doped silver tungstate ($Ag_2WO_4$) nanoparticles with an aqueous solution to form a mixture. The aqueous solution includes one or more pollutants. The method further includes mixing the mixture and collecting a filtrate. The filtrate has fewer of the one or more pollutants than the aqueous solution. The amount of sulfur present in the sulfur-doped $Ag_2WO_4$ nanoparticles is in a range from 5% to 30% of the total weight of the sulfur-doped $Ag_2WO_4$ nanoparticles, and the sulfur-doped $Ag_2WO_4$ nanoparticles are spherical particles with diameters ranging from 2 nanometers (nm) to 40 nm.

20 Claims, 18 Drawing Sheets

(51) Int. Cl.
  *B01J 20/34* (2006.01)
  *C02F 101/30* (2006.01)
(52) U.S. Cl.
  CPC ........ *C02F 1/281* (2013.01); *C02F 2101/308* (2013.01); *C02F 2303/16* (2013.01); *C02F 2305/08* (2013.01)

(56) References Cited

FOREIGN PATENT DOCUMENTS

| | | | | |
|---|---|---|---|---|
| WO | WO-2019012278 A | * | 1/2019 | ............. B01D 53/02 |
| WO | WO 2022/024747 A1 | | 2/2022 | |

OTHER PUBLICATIONS

A. F. Gouveia, et al., Ag2WO4 as a multifunctional material: Fundamentals and progress of an extraordinarily versatile semiconductor, Journal of Materials Research and Technology, vol. 21, 2022, pp. 4023-4051, https://doi.org/10.1016/j.jmrt.2022.11.011. (Year: 2022).*

Nada D. Ali, et al., "Silver tungstate decorated carbon nanotubes (Ag2WO4/CNTs) for enhanced adsorptive removal of malachite green dye", AIP Conf. 2nd international Conference on Engineering and Advanced Technology: (ICEAT 2022) vol. 2787, Issue 1. Jul. 14, 2023 (1 page).

Santosh Kumar Gupta, et al.. "Doping-induced room temperature stabilization of metastable ß-Ag2WO4 and origin of visible amission in α- and ß-Ag2WO4: low temperature photoluminescence studies", The Journal of Physical Chemistry C. vol. 120, Issue 13, Mar. 22, 2016 (2 pages).

Roman Alvarez-Roca, et al., "Selective synthesis of α-, ß-, and γ-Ag2WO4 polymorphs: promising platforms for photocatalytic and antibacterial materials", Inorganic Chemistry, vol. 60, Issue 2, Dec. 29, 2020 (60 pages).

* cited by examiner

SULFER-DOPED SILVER TUNGSTATE (AG2WO4) NANOPARTICLES FOR WATER DECONTAMINATION

STATEMENT REGARDING PRIOR DISCLOSURE BY THE INVENTORS

Aspects of the present disclosure are described in Khairy, M., et. al, "Surfactant-Assisted synthesis of α- and β-Ag$_2$WO$_4$ modified with Sulphur, Phosphorous [sic phosphorus], and boron and their applications in wastewater elimination," Journal of Photochemistry & Photobiology, A: Chemistry, Volume 450, 2024, which is incorporated herein by reference in its entirety.

Aspects of the present disclosure are described in Mohamed, M., et. al, "Phosphorous [sic phosphorus], boron and sulphur-doped silver tungstate-based nanomaterials toward electrochemical methanol oxidation and water splitting energy applications," International Journal of Hydrogen Energy, Volume 50, 2023, which is incorporated herein by reference in its entirety.

BACKGROUND

Technical Field

The present disclosure is directed towards water decontamination techniques and, more particularly, relates to a method of water decontamination using sulfur-doped silver tungstate (Ag$_2$WO$_4$) nanoparticles.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

With the advent of industrialization, water pollution has increased multi-fold. Numerous organic and biological contaminants, including bacteria and industrial pollutants, are present in water. There are two major types of pollutants including municipal pollutants and pollutants from industrial waste. The main pollutants found in wastewater include phosphates, pesticides, herbicides, dyes, mineral ions, and insecticides. At present, a few categories of colour removal technologies exist, including, but not limited to, chemical removal, biological removal, and physical removal. Chemical methods depend on the chemical reactions between the desired pollutants and the materials used to either remove the pollutants or help in the destruction of dangerous effects related to pollutants. Physical treatment means are also extensively utilized, such as electrodialysis, reverse osmosis, nanofiltration, and adsorption, which allow for eliminating all undesirable materials without varying their chemical structures. Biological methods include fungal decolorization, degradation by microbes, and adsorption by (living or dead) microbiological biomass, and bioremediation approaches are frequently applied to the treatment of manufacturing sewage. However, biological approaches for dye removal haven't been very successful because most dyes are not biodegradable. Accordingly, some effective physicochemical processes to remove dye contamination include adsorption, membrane filtration, coagulation/flocculation, electrochemical treatment, and chemical oxidation. The adsorption method may be a favourable method for the treatment of dyes.

Photocatalysis, on the other hand, is a process used to remove water pollutants by focusing light onto a catalyst connected to the pollutants. The light in the presence of a photocatalyst assists in creating oxidative radicals such as hydroxyl and superoxide radicals, which play the main role in the degradation process. Metal oxides and composite materials are just two examples of the many photocatalytic materials that have been researched. Due to their effective electrical, optical, magnetic, and catalytic capabilities, a plurality of economically feasible metal tungstates, molybdates, and vanadates have been evaluated recently. Silver tungstate (Ag$_2$WO$_4$) may be considered a promising replacement for the extensively researched compounds now utilized as photocatalysts such as, TiO$_2$, ZnO, and WO$_3$. The photocatalytic activity of α-Ag$_2$WO$_4$ and β-Ag$_2$WO$_4$ under UV light has been described in recent research, specifically for orthorhombic α-Ag$_2$WO$_4$, which reveals good luminescent, antimicrobial, and gas-sensing properties.

Further, standard hydrothermal and microwave hydrothermal fabrication methods may be used at nano and microscale levels to produce α-Ag$_2$WO$_4$ materials. In order to overcome the low surface area of the tungstate and increase the photocatalysis effects, researchers recently deposited the semiconductor (Ag$_2$WO$_4$) on a g-C$_3$N$_4$ substrate. However, Ag$_2$WO$_4$ is unstable when exposed to intense light for an extended period of time, and photocorrosion reduces catalyst efficiency when it is reused. Numerous effective photocatalyst procedures were devised to overcome the drawback and increase the photocatalytic activity. These strategies included ion doping with Eu$^{3+}$, Dy$^{3+}$, Tm$^{3+}$, Er$^{3+}$, organic dye sensitization, deposition, noble metal decorating, and doping of metal or metal oxides WO$_3$, and Fe$_3$O$_4$—Ag$_2$WO$_4$.

As a result, there is an ongoing search for adsorbent/photocatalyst materials with improved applicability. Accordingly, it is one object of the present disclosure to provide a method for water decontamination that may circumvent the limitations of traditional techniques, such as poor adsorption capacity, low sustainability, and inefficiency in processing chemically advanced dyes.

SUMMARY

In an exemplary embodiment, a method of water decontamination is described. The method includes contacting sulfur-doped silver tungstate (Ag$_2$WO$_4$) nanoparticles with an aqueous solution to form a mixture. The aqueous solution includes one or more pollutants. The method includes mixing the mixture for a period of time and collecting a filtrate. The filtrate has fewer of the one or more pollutants than the aqueous solution. The amount of sulfur present in the sulfur-doped Ag$_2$WO$_4$ nanoparticles is in a range from 5 wt. % to 30 wt. % of the total weight of the sulfur-doped Ag$_2$WO$_4$ nanoparticles. The sulfur-doped Ag$_2$WO$_4$ nanoparticles are spherical particles with diameters ranging from 2 nanometers (nm) to 40 nm.

In some embodiments, the sulfur-doped Ag$_2$WO$_4$ nanoparticles have an amorphous morphology when examined by X-ray diffraction (XRD).

In some embodiments, the amount of sulfur present in the sulfur-doped Ag$_2$WO$_4$ nanoparticles is in a range from 10 wt. % to 25 wt. % of the total weight of the sulfur-doped Ag$_2$WO$_4$ nanoparticles. In some embodiments, the amount of sulfur present in the sulfur-doped Ag$_2$WO$_4$ nanoparticles is in a range from 13 wt. % to 22 wt. % of the total weight of the sulfur-doped $Ag_2WO_4$ nanoparticles.

In some embodiments, the indigo carmine dye adsorption capacity is greater than or equal to 30 qt (mg/g), the mixture is mixed for 60 minutes, and the pH of the aqueous solution is in a range from 6 to 8.

In some embodiments, the starting concentration of indigo carmine dye is in a range from 95 parts per million (ppm) to 105 ppm.

In some embodiments, the indigo carmine dye adsorption capacity is greater than or equal to 20 qt (mg/g), the mixture is mixed for 60 minutes, and the pH of the aqueous solution is in a range from 2 to 5. In some embodiments, the indigo carmine dye adsorption capacity is greater than or equal to 3 qt (mg/g), the mixture is mixed for 60 minutes, and the pH of the aqueous solution is in a range from 9 to 11.

In some embodiments, the indigo carmine dye adsorption capacity is greater than or equal to 25 qt (mg/g), the mixture is mixed for 10 minutes, and the pH of the aqueous solution is in a range from 6 to 8.

In some embodiments, the indigo carmine dye adsorption capacity is greater than or equal to 32 qt (mg/g), the mixture is mixed for 80 minutes, and the pH of the aqueous solution is in a range from 6 to 8. In some embodiments, the indigo carmine dye removal efficiency is greater 95%, the mixture is mixed for 80 minutes, and the pH of the aqueous solution is in a range from 6 to 8.

In some embodiments, the indigo carmine dye adsorption capacity is greater than or equal to 25 qt (mg/g), the mixture is mixed for 60 minutes, the pH of the aqueous solution is in a range from 6 to 8, and the starting concentration of indigo carmine dye is in a range from 15 to 25 ppm.

In some embodiments, the indigo carmine dye adsorption capacity is greater than or equal to 60 qt (mg/g), the mixture is mixed for 60 minutes, the pH of the aqueous solution is in a range from 6 to 8, and the starting concentration of indigo carmine dye is in a range from 45 to 55 ppm.

In some embodiments, the indigo carmine dye adsorption capacity is greater than or equal to 80 qt (mg/g), the mixture is mixed for 60 minutes, the pH of the aqueous solution is in a range from 6 to 8, and the starting concentration of indigo carmine dye is in a range from 75 to 85 ppm.

In some embodiments, the indigo carmine dye adsorption capacity is greater than or equal to 20 qt (mg/g), the mixture is mixed for 60 minutes, the pH of the aqueous solution is in a range from 6 to 8, and the starting concentration of indigo carmine dye is in a range from 145 to 155 ppm.

In some embodiments, the sulfur-doped $Ag_2WO_4$ nanoparticles are reusable after a undergoing a regeneration cycle including washing the sulfur-doped $Ag_2WO_4$ nanoparticles with 0.1 M HCl and then rinsing the sulfur-doped $Ag_2WO_4$ nanoparticles with water.

In some embodiments, the indigo carmine dye removal efficiency is greater than or equal to 90% after 3 regeneration cycles.

In some embodiments, the methyl red dye adsorption removal efficiency is greater than or equal to 90%.

In some embodiments, the indigo carmine dye removal efficiency and the methyl red dye adsorption removal efficiency are both greater than or equal to 90%, the starting concentration of indigo carmine dye is 20 ppm and the starting concentration of methyl red dye is 20 ppm.

In some embodiments, the temperature of the aqueous solution is in a range from 20° C. to 40° C.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
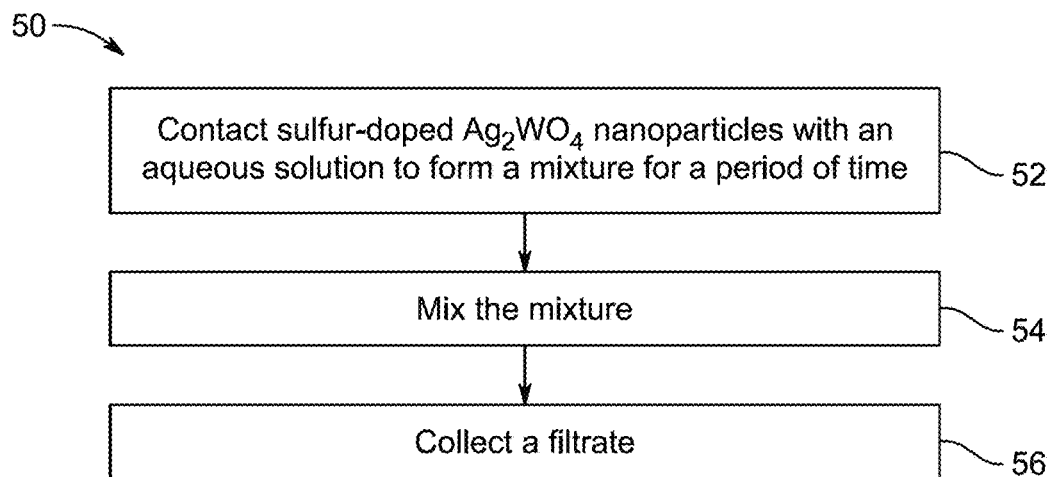
FIG. 1 is a schematic flowchart depicting a method of water decontamination, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

As used herein, the term "water decontamination" refers to the process of removing harmful substances, pollutants, or microorganisms from water to make it safe for human use, environmental discharge, or other applications. This process can involve physical, chemical, or biological methods, including filtration, chemical treatment, or the use of advanced technologies like ultraviolet light or ozone treatment.

As used herein, the term "pollutants" refers to substances or contaminants that, when present in the environment, can cause harm to ecosystems, human health, or water quality. This includes a wide range of chemical, biological, and physical agents such as heavy metals (e.g., lead, mercury), organic compounds (e.g., dyes, pharmaceuticals), pathogens (e.g., bacteria, viruses), and physical debris (e.g., plastics). Pollutants may originate from various sources, including industrial processes, agricultural runoff, wastewater discharges, and improper waste disposal. Their presence in air, water, or soil can lead to adverse environmental effects, necessitating effective remediation strategies to mitigate their impact. "Pollutants" may be used interchangeably with "contaminants".

As used herein, the term "pH" refers to the measure of acidity or alkalinity of an aqueous solution, quantified on a logarithmic scale ranging from 0 to 14. A pH value of 7 is considered neutral, indicating a balanced concentration of hydrogen ions (H+) and hydroxide ions (OH$^-$). Values below 7 indicate acidic conditions, characterized by a higher concentration of hydrogen ions, while values above 7 denote basic (alkaline) conditions, with a greater concentration of hydroxide ions.

As used herein, the term "filtrate" refers to the liquid that has passed through a filtration medium after a separation process, typically involving the removal of solid particles, contaminants, or impurities from a mixture. The filtrate contains the dissolved substances or remaining components that have been retained in the solution while larger particles or suspended solids are left behind in the filter or filtration apparatus. In the context of water treatment or environmental remediation, the filtrate represents the treated solution that has undergone processes such as adsorption, sedimentation, or other purification methods, indicating the effectiveness of the treatment in reducing pollutant concentrations.

As used herein, the term "adsorbent" refers to a material or substance that has the ability to attract and hold molecules from a liquid or gas onto its surface through physical or chemical interactions.

As used herein, the term "adsorption" refers to the process by which atoms, ions, or molecules from a liquid or gas phase adhere to the surface of a solid material, known as an adsorbent. This process occurs due to various intermolecular forces, including van der Waals forces, hydrogen bonding, and electrostatic interactions.

As used herein, the term "adsorption capacity" refers to the maximum amount of a substance, typically a pollutant or contaminant, that an adsorbent can effectively capture and retain from a liquid or gas phase per unit mass of the adsorbent. This capacity is often expressed in units such as milligrams of adsorbate per gram of adsorbent (mg/g). Adsorption capacity is a useful parameter in evaluating the performance of adsorbents in various applications, including water treatment and environmental remediation, as it indicates the efficiency and effectiveness of the material in removing specific contaminants from solutions. One with ordinary skill in the art will understand that adsorption capacities of a given adsorbent for a given contaminant may vary due to differences in batch-to-batch synthesis of the adsorbent, differences in starting materials for the adsorbent, and the conditions of the adsorbent application.

Aspects of this disclosure are directed to a method of water decontamination using sulfur-doped $Ag_2WO_4$ nanoparticles. Water decontamination by adsorption offers advantages, making it a popular method for removing pollutants from aqueous solutions. The adsorption process is generally simple and cost-effective, requiring less complex equipment than methods like reverse osmosis or chemical oxidation.

FIG. 1A illustrates a schematic flow chart of a method 50 of water decontamination. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes contacting sulfur-doped $Ag_2WO_4$ nanoparticles with an aqueous solution to form a mixture. Sulfur-doped $Ag_2WO_4$ nanoparticles are highly effective in the adsorptive removal of dyes from aqueous solutions due to the distinct roles played by their constituent elements.

Tungsten (W) provides structural stability and is beneficial for the electronic properties that support photocatalytic activity. Silver (Ag) not only enhances the photocatalytic efficiency through its ability to act as a charge carrier, improving electron mobility, but it also imparts antibacterial properties that help mitigate microbial growth during the adsorption process. In some embodiments, the silver source may include, but is not limited to, silver nitrate, silver chloride, silver acetate, silver oxide, silver phosphate and/or its hydrates thereof. In a preferred embodiment, the silver source is silver nitrate.

Sulfur (S) doping modifies the electronic structure, narrowing the bandgap and improving light absorption, which increases the generation of reactive species for dye degradation. This doping also boosts the surface area and active sites, enhancing adsorption kinetics and capacity. Together, these elements create a synergistic effect that makes sulfur-doped $Ag_2WO_4$ nanoparticles a promising solution for effective dye decontamination in water remediation applications.

In some embodiments, elements like boron (B), nitrogen (N), titanium (Ti), iron (Fe), carbon (C), phosphorus (P), manganese (Mn), zinc (Zn), cobalt (Co), bismuth (Bi) and selenium (Se) may also be used. In preferred embodiment, doping element used is sulphur (S).

In some embodiments, the amount of sulfur present in the sulfur-doped $Ag_2WO_4$ nanoparticles may range from 5 to 30 wt. %, 10 to 25 wt. %, and 13 to 22 wt. % of the total weight of the sulfur-doped $Ag_2WO_4$ nanoparticles. In a preferred embodiment, the amount of sulfur present in the sulfur-doped $Ag_2WO_4$ nanoparticles is 20 wt. % of the total weight of the sulfur-doped $Ag_2WO_4$ nanoparticles.

Sulfur-doped $Ag_2WO_4$ nanoparticles can be structurally characterized using X-ray diffraction (XRD). $Ag_2WO_4$ and its sulfur-doped variations may have distinct crystalline phases, such as amorphous, orthorhombic, tetragonal, or cubic structures. In the preferred embodiment, $Ag_2WO_4$ exhibits the orthorhombic phase. Furthermore, the sulfur-doped form has an amorphous phase, which contributes to unique features that improve its prospective applications in photocatalysis and water purification.

The morphology of sulfur-doped $Ag_2WO_4$ composite can be structurally characterized using transmittance electron microscopy (TEM) analysis. The composite may exhibit a range of morphological shapes, including, but not limited to, nanocrystals, nanorectangles, nanotriangles, nanopentagons, nanohexagons, nanoprisms, nanodisks, nanocubes, nanoribbons, nanoblocks, nanobeads, nanoflakes, nanopowders, and nanoflowers, as well as mixtures thereof.

In a preferred embodiment, the $Ag_2WO_4$ exhibits primarily nanorods with widths of 57.4 nm and lengths of 302.4 nm, as well as a few spherical particles with a 31.8 nm diameter. In one or more embodiments the sulfur-doped $Ag_2WO_4$ nanoparticles are spherical, although other shapes may be included. In one or more embodiments, the individualized sulfur-doped $Ag_2WO_4$ nanoparticles have an average diameter ranging from 2 to 40 nm, 2 to 35 nm, 2 to 30 nm, 2 to 25 nm, 2 to 20 nm, 2 to 15 nm, and preferably 5 to 15 nm. Aggregates of the sulfur-doped $Ag_2WO_4$ nanoparticles are porous, preferably mesoporous, with pore apertures having a size in the range of 10-70 nm, with pore apertures having sizes in the range of 10-15 nm, 15-20 nm, 20-25 nm, 25-30 nm, 30-35 nm, 35-40 nm, 40-45 nm, 45-50 nm, 50-55 nm, 55-60 nm, 60-65 nm, 65-70 nm. In some embodiments, doping sulfur results in an amorphous structure of $Ag_2WO_4$ that is mainly configured as a β-form $Ag_2WO_4$.

The atomic concentration of individual elements present in the sulfur-doped $Ag_2WO_4$ nanoparticles is determined as the percentage of atoms a particular element is represented in the total number of atoms. In one or more embodiments, the atomic concentration of sulfur present in the sulfur-doped $Ag_2WO_4$ nanoparticles is in a range from 10-30%, preferably 12-12%, preferably 15-20%, preferably 18%; nitrogen is present in the sulfur-doped $Ag_2WO_4$ nanoparticles in a range from 1-3%, preferably 2%; silver is present in the sulfur-doped $Ag_2WO_4$ nanoparticles in a range from 10-25%, preferably 15-20% preferably 17%; tungsten is present in the sulfur-doped $Ag_2WO_4$ nanoparticles in a range from 10-25%, preferably 15-20%, preferably 18%; carbon is present in the sulfur-doped $Ag_2WO_4$ nanoparticles in a range from 10-30%, preferably 17-27%, preferably 20-25%, preferably 22%; and bromine is present in the sulfur-doped $Ag_2WO_4$ nanoparticles in a range from 1-10%, preferably 0.03-0.07 at. %, preferably 0.05 at. %. The bromine and carbon in the sulfur-doped $Ag_2WO_4$ nanoparticles are due to the presence of a leftover surfactant template. In some embodiments, the atomic concentrations of each of these individual elements in the doped nanoparticles may vary beyond the provided ranges—such a variation is dependent on the method of synthesis, as obvious to a person skilled in the art. One with ordinary skill in the art will understand that the atomic concentrations given above may vary and have similar performance in the application of water decontamination.

The aqueous solution comprises water collected from various sources, including but not limited to seawater, brackish coastal waters, wastewater, contaminated water, saline or contaminated saline water, streams (streams near the ocean), and the like. Desalination systems are desirable in many arid regions and in marine applications where freshwater supplies are limited, but large amounts of seawater, inland waterways, rivers, or other sources of salt-containing water are available. Other feed streams can originate from a variety of sources. For example, in certain embodiments, at least a portion of the stream fed to the water purification process comprises and/or is derived from water from an oil or gas well, and/or the effluent of a chemical process (e.g., the effluent of another desalination system, or another chemical process), can also be used. In some embodiments, the aqueous solution for water decontamination may comprise a mixture of synthetic wastewater containing dyes, heavy metals, agricultural runoff, industrial effluents, oil and grease, food processing wastewater, a heavy metal solution, landfill leachate, textile wastewater, mining effluents, household wastewater, and pharmaceutical contaminants. One with ordinary skill in the art will understand many possible waste and non-waste streams exist that this disclosure may be applied to.

The pollutant is at least one selected from the group consisting of a dye, a phenol, a polycyclic aromatic hydrocarbon, an herbicide, a pesticide, and/or combinations thereof. One with ordinary skill in the art will recognize that the behavior of a model pollutant may be used to investigate the behavior of wide range of similar compounds.

In some embodiments, the pollutant is a dye. One with ordinary skill in the art will recognize that the behavior of a model dye may be used to investigate the behavior of wide range of similar dye compounds. A dye is a colored substance that chemically binds to a material it may be intended to color. Examples of dyes include, but are not limited to: acridine dyes, which are acridine and its derivatives such as acridine orange, acridine yellow, acriflavine, and gelgreen; anthraquinone dyes, which are anthroaquinone and its derivatives such as acid blue 25, alizarin, anthrapurrin, carminic acid, 1,4-diamino-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FIAsH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red O, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin's mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythrosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B. In preferred embodiments, the pollutants are indigo carmine and methyl red dye.

The initial concentration of dye in the adsorption process plays a role in determining the efficiency and kinetics of the adsorption mechanism. Higher initial dye concentrations generally lead to an increased driving force for the mass transfer of dye molecules from the solution to the adsorbent surface, resulting in enhanced adsorption rates. At elevated concentrations, more dye molecules are available to interact with the available active sites on the adsorbent, which can lead to higher adsorption capacities. However, beyond a certain concentration, the adsorption process may reach saturation, where all active sites are occupied, leading to a decrease in dye removal efficiency. Additionally, higher concentrations can result in competitive adsorption, where multiple dye species may hinder each other's binding to the adsorbent. Thus, optimizing the initial dye concentration is beneficial for maximizing the effectiveness of the adsorption process in water decontamination applications. In some embodiments, the starting concentration/the initial concentration of indigo carmine dye and/or methyl red dye in the polluted water intended for treatment may range from 95 to 105 ppm, 15 to 25 ppm, 45 to 55 ppm, 75 to 85 ppm, 145 to 155 ppm. One with ordinary skill in the art will understand many initial concentration are possible, and while certain conditions may yield improved performance, adsorbents may function at a wide range of contaminant concentrations.

The pH of the dye solution plays a role in the adsorption process, influencing both the dye's ionization state and the surface charge of the adsorbent material. Many dyes are ionizable compounds, and their molecular form can change with varying pH levels. At different pH values, the degree of ionization affects the dye's solubility and the extent to which it can adsorb onto the adsorbent surface. For instance, at lower pH levels, cationic dyes may be more positively charged, enhancing their attraction to negatively charged adsorbents. Conversely, at higher pH levels, anionic dyes may become negatively charged, potentially repelling them from similarly charged surfaces.

In some embodiments, the pH of the aqueous solution may be maintained within specific ranges, including 6 to 8, 2 to 5, and 9 to 11. The desired pH levels can be achieved through the careful addition of acids and bases. In particular, the acids utilized may include hydrochloric acid (HCl), sulfuric acid ($H_2SO_4$), nitric acid ($HNO_3$), acetic acid ($CH_3COOH$), and phosphoric acid ($H_3PO_4$). Conversely, the bases employed for pH adjustment may consist of sodium hydroxide (NaOH), potassium hydroxide (KOH), ammonium hydroxide ($NH_4OH$), sodium bicarbonate ($NaHCO_3$), and lithium hydroxide (LiOH). The concentrations of these acids and bases used in the experiments can range from 1.0 M, 2.0 M, 3.0 M, 0.5 M, 0.25 M, allowing for precise control over the pH of the aqueous solution to enhance conditions for water decontamination processes.

The temperature of the aqueous solution affects the adsorption process by influencing the kinetics and thermodynamics of dye interactions with the adsorbent. Increased temperature raises the kinetic energy of dye molecules, enhancing diffusion rates and mobility, which facilitates their transfer to the adsorbent surface, often resulting in improved adsorption capacities and faster uptake rates. Higher temperatures can also strengthen interactions between the dye and the adsorbent. However, excessively high temperatures may cause desorption or degradation of either the dye or the adsorbent, reducing adsorption efficiency. In some embodiments, the temperature of the aqueous solution may range from 20 to 40° C., 25 to 40° C., 30 to 40° C., 35 to 40° C.

At step 54, the method 50 includes mixing the mixture. The mixture is mixed to facilitate homogeneity and effective interactions among the various constituents. Mixing enhances the dispersion of the adsorbent within the aqueous solution, allowing for optimal contact between the adsorbent and the target contaminants, such as dyes. In some embodiments, the mixture is mixed for 60 minutes, 10 minutes, 80 minutes. Appropriate lengths for the period of time for mixing the mixture are found herein and may be in a range from 1-1000 minutes, preferably 10-100 minutes, most preferably 40-80 minutes. Other periods of time may be used, but may result in reduced performance or long periods of time that reduce efficiency.

At step 56, the method 50 includes collecting a filtrate, which is the liquid that passes through a filtration medium after the adsorption process. The filtration process allows the separation of the treated aqueous solution from the adsorbent and the contaminants that have been effectively removed. The filtrate has fewer of the one or more pollutants than the aqueous solution, indicating the effective adsorption process.

In some embodiments, when the initial concentration of indigo carmine dye may be maintained within the range of 95 to 105 ppm, the adsorption capacity is affected by the pH of the aqueous solution and the duration of the adsorption process. Specifically, at a pH range of 6 to 8, the adsorption capacity is observed to be greater than or equal to 30 qt, 25 qt, 20 qt, 15 qt, 10 qt (mg/g) over a period of 60 minutes. Conversely, when the pH is adjusted to a range of 2 to 5, the adsorption capacity decreases, yielding values greater than or equal to 20 qt, 15 qt, 10 qt, 5 qt (mg/g) within the same time frame. At higher pH levels, specifically in the range of 9 to 11, the adsorption capacity further diminishes, showing values greater than or equal to 3 qt, 2 qt, 1 qt (mg/g) after 60 minutes. The pH influences the adsorption capacity (qt) of indigo carmine dye, with varying outcomes across different pH levels. In a basic medium, the adsorption capacity is low due to the ionization of the dye and repulsion between negatively charged dye molecules and the adsorbent. In acidic conditions, although some adsorption occurs, the capacity remains relatively low due to protonation, which limits effective binding sites. In contrast, within the optimal pH range of 6 to 8, the adsorption capacity is higher, as this pH balance promotes stronger interactions between the dye and the adsorbent, maximizing the availability of binding sites.

In some embodiments, at a pH of 6 to 8, the adsorption process demonstrates notable variations with respect to contact time. For instance, with a shorter contact time of 10 minutes, the adsorption capacity is recorded at greater than or equal to 25 qt, 20 qt, 15 qt, 10 qt, or 5 qt (mg/g). Extending the contact time to 80 minutes enhances the adsorption capacity to greater than or equal to 32 qt, 30 qt, 25 qt, 20 qt, 15 qt, 10 qt, or 5 qt (mg/g). Notably, under these optimized conditions, the removal efficiency of indigo carmine dye exceeds 95%, 85%, 75%, or 65% after a period of 80 minutes, highlighting the effectiveness of the adsorption process under specific pH conditions and timeframes. The effect of time on the adsorption capacity (qt) of indigo carmine dye is notable, as extended contact time generally leads to increased adsorption. Initially, as the dye molecules come into contact with the adsorbent, a rapid uptake occurs, driven by high concentrations and strong diffusion forces. As time progresses, the adsorption sites on the adsorbent become progressively occupied, leading to a gradual increase in qt.

In some embodiments, the indigo carmine dye adsorption capacity is greater than or equal to 25 qt, 20 qt, 15 qt, 10 qt, or 5 qt (mg/g) when the initial concentration of indigo carmine dye is set between 15 and 25 ppm. This capacity is achieved within a period of 60 minutes, with the pH of the aqueous solution maintained in the range of 6 to 8.

In some embodiments, the indigo carmine dye adsorption capacity is greater than or equal to 60 qt, 50 qt, 40 qt, 30 qt, 20 qt, or 10 qt (mg/g) when the initial concentration of indigo carmine dye is set between 45 and 55 ppm. This capacity is achieved within a period of 60 minutes, with the pH of the aqueous solution maintained in the range of 6 to 8.

In some embodiments, the indigo carmine dye adsorption capacity is greater than or equal to 80 qt, 70 qt, 60 qt, 50 qt, 40 qt, 30 qt, 20 qt, or 10 qt (mg/g) when the initial concentration of indigo carmine dye is set between 75 and 85 ppm. This capacity is achieved within a period of 60 minutes, with the pH of the aqueous solution maintained in the range of 6 to 8.

In some embodiments, the indigo carmine dye adsorption capacity is greater than or equal to, 20 qt, 15 qt, 10 qt, or 5 qt (mg/g) when the initial concentration of indigo carmine dye is set between 145 and 155 ppm. This capacity is achieved within a period of 60 minutes, with the pH of the aqueous solution maintained in the range of 6 to 8.

In some embodiments, the indigo carmine dye removal efficiency and the methyl red dye adsorption removal efficiency are both greater than or equal to 90%, 80%, 70%, 60%, or 50% when the starting concentration of indigo carmine dye is 20 ppm and the starting concentration of methyl red dye is 20 ppm.

The sulfur-doped $Ag_2WO_4$ nanoparticles are reusable after a undergoing a regeneration cycle. The sulfur-doped $Ag_2WO_4$ nanoparticles can be regenerated by washing the sulfur-doped $Ag_2WO_4$ nanoparticles with 0.1 M HCl and then rinsing the sulfur-doped $Ag_2WO_4$ nanoparticles with water. In some embodiments, other acids may be utilized including hydrochloric acid (HCl), sulfuric acid ($H_2SO_4$), nitric acid ($HNO_3$), acetic acid ($CH_3COOH$), and phosphoric acid ($H_3PO_4$). In some embodiments, the concentration of acid may be 1.0 M, 2.0 M, 3.0 M, 0.5 M, 0.25 M. In the context of this disclosure, "reusable" means that the material has acceptable adsorption performance, e.g., at least 50% preferably at least 70%, 80% or 90% of an acceptable adsorption demonstrate prior to a regeneration cycle.

In some embodiments, the indigo carmine dye removal efficiency is greater than or equal to 90%, 80%, 70%, 60%, or 50% after 3 regeneration cycles. The methyl red dye adsorption removal efficiency may be greater than or equal to 90%, 80%, 70%, 60%, or 50% after 3 regeneration cycles.

EXAMPLES

The following examples provide a method of water decontamination. The examples are provided solely for illustration and are not to be construed as limitations of the present disclosure, as many variations thereof are possible without departing from the spirit and scope of the present disclosure.

Example 1: Surfactant Assisted Synthesis of Undoped α-$Ag_2WO_4$ Nanoparticles The α-$Ag_2WO_4$ nanoparticles were manufactured by a precipitation route at 80° C. in the presence of the cationic surfactant cetyltrimethylammonium bromide (CTAB) ($C_{19}H_{42}NBr$). Initially, a solution A was formed by dissolving $6.5 \times 10^{-3}$ moles (mol) of silver nitrate ($AgNO_3$) in 30 milliliters (mL) of bi-distilled water. Further, a solution B was formed by dissolving $3.6 \times 10^{-3}$ mol of dihydrate sodium tungstate ($Na_2WO_4 \cdot 2H_2O$) and 0.7 grams (g) of CTAB in 40 mL of bi-distilled water. The solution B was heated under continuous stirring at 80 degrees Celsius (° C.). Furthermore, solution A of silver nitrate was added to solution B of sodium tungstate and stirred for 15 minutes (min) at 80° C. The precipitate was subsequently separated and rinsed multiple times with distilled water and ethanol to eliminate the $Na^+$ ions, $NO_3$ ions, and any remaining organic molecules. After 12 hours, the product was dried at 60° C. The sample was denoted as AgW.

Example 2: Synthesis of Sulfur (S) Doped $Ag_2WO_4$

B-doped α-$Ag_2WO_4$ nanoparticles were synthesized using the same procedure as described above for synthesizing the α-$Ag_2WO_4$, with the addition of 20 mL boric acid solution to prepare 20 wt. % urea. The above solution was further added to a 30 ml solution of sodium tungstate under continuous stirring at 80° C. in the presence of CTAB (0.7 g). Sliver nitrate solution was inserted to the above solution at 80° C. and agitated for 15 min to synthesize the S@AgW nanoparticles. Finally, after filtering and washing numerous times with distilled water and ethanol, the residue was dried for 12 hours at 60° C. The samples were denoted as S@AgW.

Example 3: Characterization

X-ray diffraction (XRD) was used to identify the crystalline states in each specimen studied, employing the JDX-8030 X-ray diffractometer, JEOL. Copper (Cu) filtered CuKα radiation of about 1.5418 angstrom (Å) powered at 45 kilovolts (kV) and 10 mA was used to run the patterns. The specimens were tested at ambient temperatures in a range of 2θ=5° to 80°. The Fourier transform infrared (FTIR) spectra of the specimens were evaluated using a KBr pellet on a Bruker-TENSOR Series-FTIR. The surface morphologies of the obtained samples were analyzed using a high-resolution transmission electron microscopy (HRTEM) using a Tecnai-G20 transmission electron microscope with a 200 kV speed voltage. The binding energy values of the fabricated catalysts were determined using a KRATOS-AXIS DID analyzer and adjusted with C1s (284.6 eV) after monochromatic aluminium-potassium K-alpha (Al-Kα) irradiation. Using a programmable inductance-capacitance-resistance (LCR) bridge (HIOKI: M3536), the electrical properties such as, residual current (RDC) and dielectric constant (ε') were assessed at fixed parameters including 1 V, 0 Hz, and 25° C. Further, a formula was used to determine the values for ε', the formula is provided hereinafter:

$$\varepsilon' = (C/\varepsilon_0) \times (t/A_s) \qquad \text{(Eq. 1)}$$

where 'C' is the equivalent capacitance, 't' is the specimen width, 'ε°' is the permittivity of vacuum, and '$A_s$' is the measuring area of the sample. Furthermore, energy dispersive X-ray (EDX) analysis was performed using an Oxford INCA X-Act. The EDX analysis was performed utilizing a line scan analysis approach.

Example 4: Adsorption Measurements

A batch equilibrium approach was used to remove indigocarmine pigment (IC) from a water-based solution employing SAgW adsorbents at 30° C. 50 mg of the as-prepared samples were added to 50 ml of the coloring solution with the specified initial concentration during stirring at 30° C. and pH 6.8 to measure the isotherms of adsorption for each specimen. The starting concentration of dye was increased from 20 to 150 mg L$^{-1}$. The effect of pH was studied and adjusted using dilute solutions of HCl and NaOH (3, 6.8, and 9). A Jasco V-550 UV-vis spectrophotometer is used to quantify the remainder of the amount of dye at λ=610 nm. The produced material's equilibrium adsorption capacity is estimated using the equation:

$$q_e = (C_0 - C_e) \times \frac{V}{W} \qquad \text{(Eq. 2)}$$

Assuming $C_0$ and Ce are the initial and equilibrium concentrations of dye in solutions (mg/L, respectively) and that V is the solution volume (L) and W is the adsorbent mass (g), then qe is the point of equilibrium of the adsorption capacity. The adsorption isotherm models of Langmuir, Freundlich, and Temkin were investigated. The kinetics of adsorption were examined using pseudo-first-order and pseudo-second-order kinetic models. The average values of all the trials were calculated after being run twice, with the greatest dramatic variance being in the 5% range.

Results (XRD)

Figure 2:
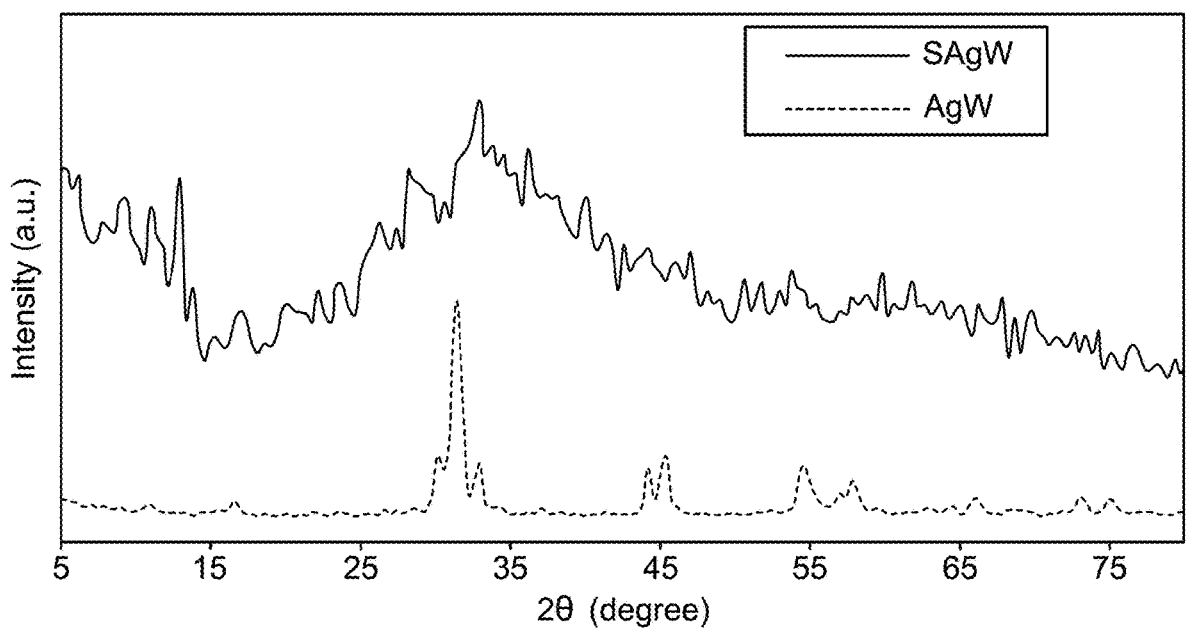
FIG. 2 is a graph depicting X-ray diffraction (XRD) patterns of silver tungstate (AgW) sample and sulfur-doped AgW (S@AgW or SAgW) nanoparticles, according to certain embodiments.

Referring to FIG. 2, a graph depicting XRD patterns of AgW and S@AgW samples is illustrated. As such, XRD was utilized to assess the crystal structure, size, and impact of the doping process on the crystal structure. The diffraction pattern of CTAB-assisting Ag$_2$WO$_4$ formation and the orthorhombic α-Ag$_2$WO$_4$ phase was discovered to exhibit the following crystallographic planes in CTAB assisting AgW: (JCPDS no. 034-0061): (110), (011), (002), (231), (400), (402), (361), (460), (333), (462), (633), and (404), indicating the formation of α-Ag$_2$WO$_4$. In addition, one more peak in the (042) plane is related to the phase of β-Ag$_2$WO$_4$ (JCPDS no. 33-1195). There are no peaks associated with silver nanoparticles, according to the XRD pattern of the CTAB-assisted formation sample. Benefiting from the Debye-Scherrer equation and the major peak of the plane (220), the crystallite sizes were determined to be 10.2 nanometers (nm). Furthermore, when doping with sulfur, it was observed to influence the crystallinity and evoke an amorphous structure of Ag$_2$WO$_4$ that is mostly configured as a β-form Ag$_2$WO$_4$.

Example 5: Morphology Characteristics

Figure 3A:
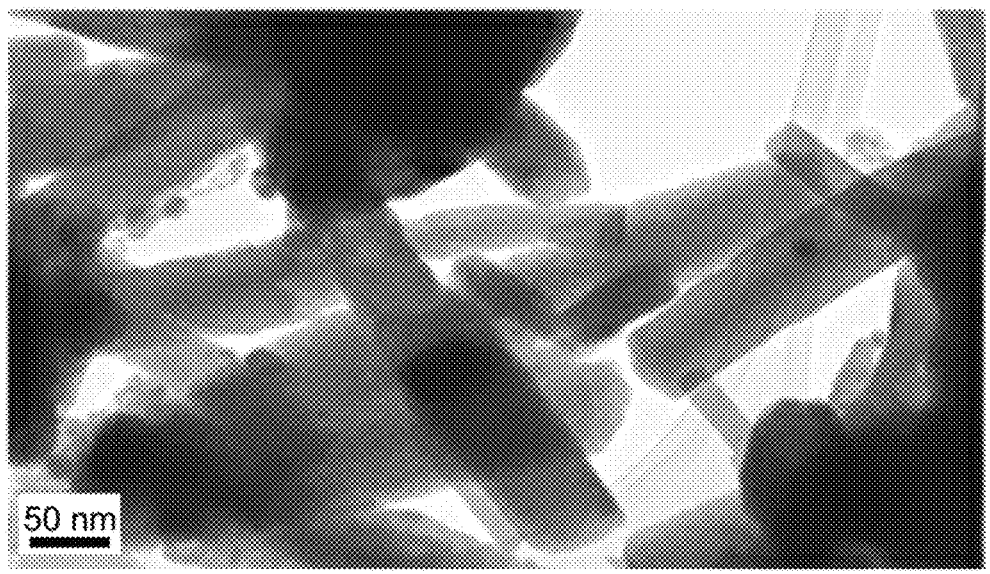
FIG. 3A is an optical image depicting transmission electron microscopy (TEM) results for AgW, according to certain embodiments.
Figure 3B:
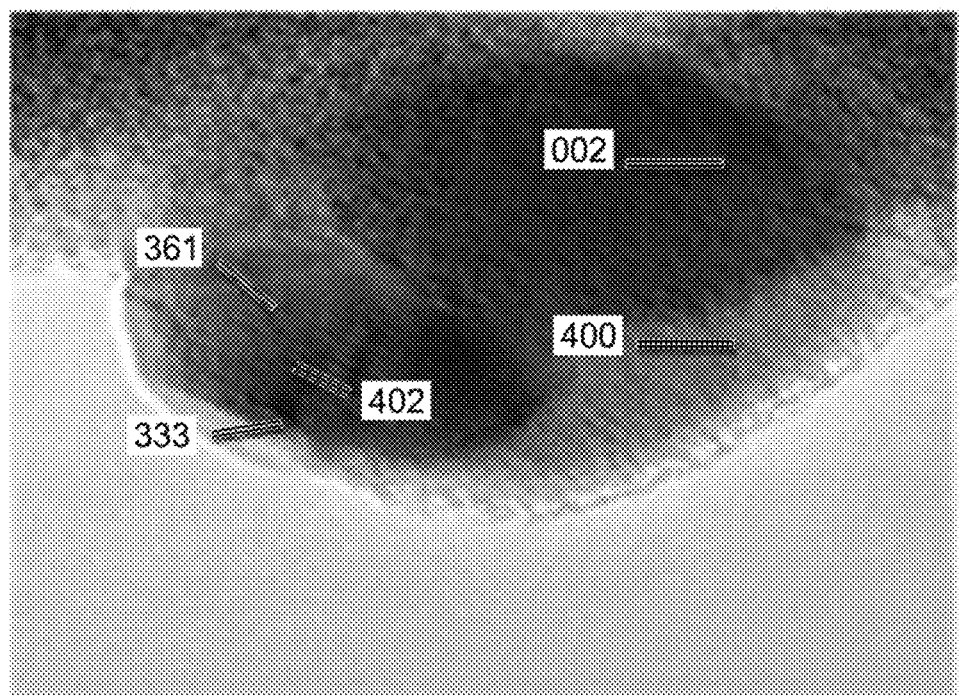
FIG. 3B is an optical image depicting high-resolution transmission electron microscopy (HRTEM) results for AgW, according to certain embodiments.

The morphological structure of AgW revealed by TEM-HRTEM observations, as shown in FIGS. 3A-3B, includes nanorods, each having a width of 57.4 nm and a length of 302.4 nm, as well as a few spherical particles with a diameter of 31.8 nm. The nanorods show evidence of oriented growth, in which the individual particles are aligned. Thus, it may be hypothesized that CTAB surfactant may function as a particle transporter and a modifier during the creation process of Ag$_2$WO$_4$, resulting in the oriented growth of Ag$_2$WO$_4$ nanorods. The CTAB surfactant accelerates the reaction of the growth units and leads to their oriented growth. CTAB is an ionic compound that ionizes completely in water (CTAB→CTA$^+$+Br$^-$). Since negative WO$_4^{-2}$ ions exist in the solution of Na$_2$WO$_4$, whereas CTA$^+$ is positively charged with a tetrahedral head and a long hydrophobic tail, the CTA$^+$-WO$_4^{-2}$ ion pairs are formed by electrostatic interaction. Adding AgNO$_3$ solution to the previously formed CTA$^+$-WO$_4^{-2}$ ion pairs form a combination of CTAB and Ag$_2$WO$_4$ according to the reaction:

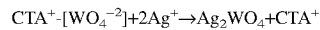

$$CTA^+-[WO_4^{-2}]+2Ag^+ \rightarrow Ag_2WO_4+CTA^+$$

The reaction as described above leads to the oriented Ag$_2$WO$_4$ growth, resulting in the nanorods. In agreement with the XRD results, the corresponding HR-TEM results show the presence of different fringes with varying spacings that correspond to the (002), (400), (361), (333), and (402) planes of α-Ag$_2$WO$_4$.

Figure 3C:
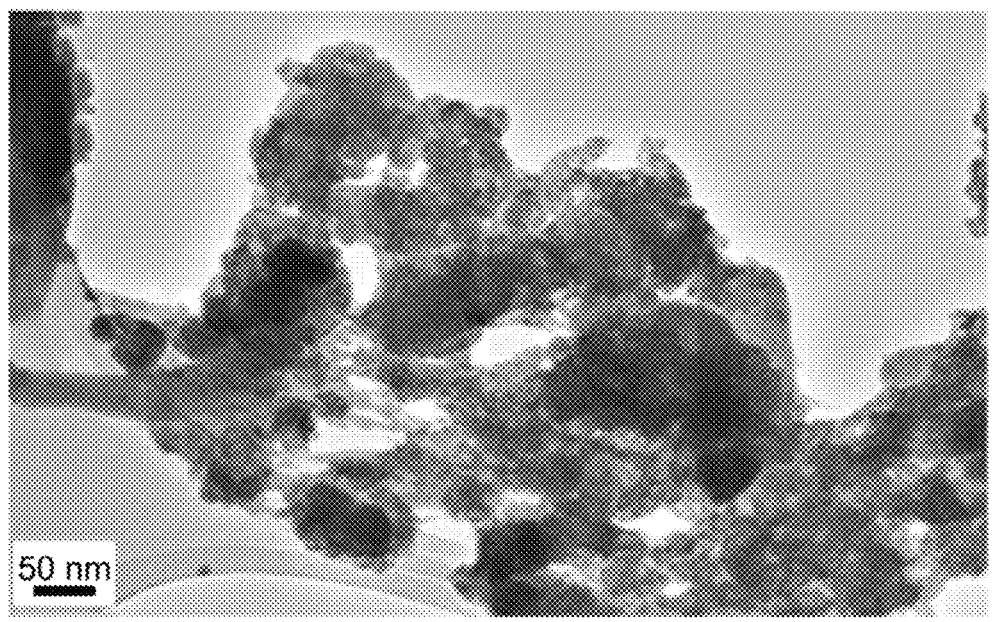
FIG. 3C is an optical image depicting TEM results for S@AgW nanoparticles, according to certain embodiments.
Figure 3D:
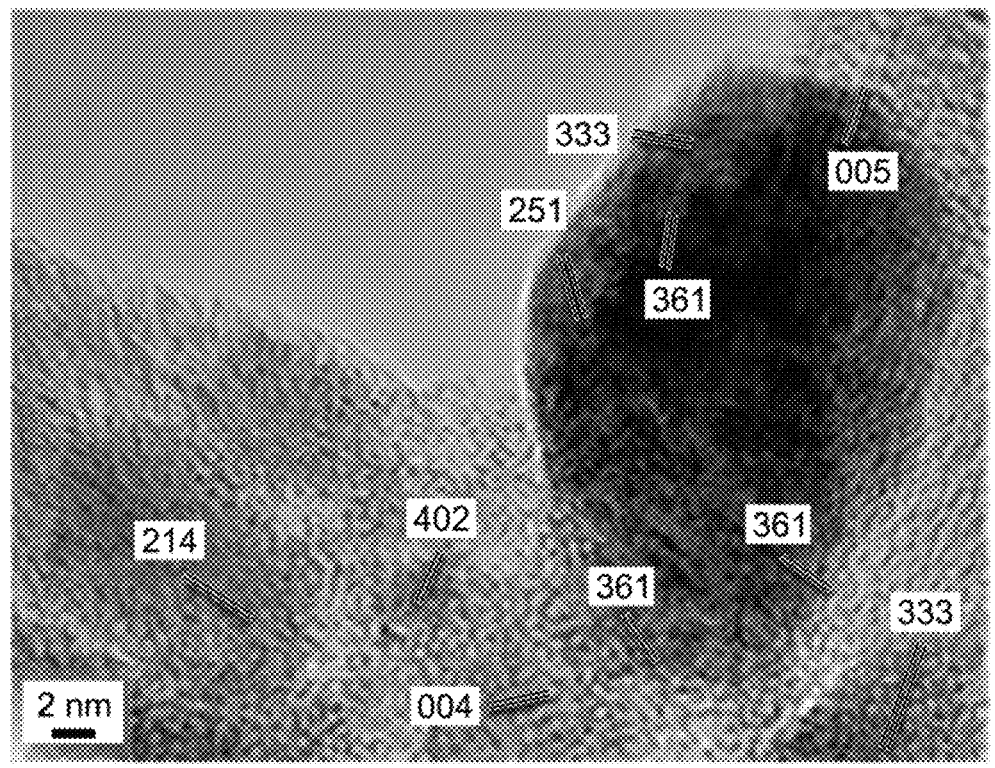
FIG. 3D is an optical image depicting HRTEM results for S@AgW nanoparticles, according to certain embodiments.

The S@AgW images, as shown in FIGS. 3C-3D show spherical particles with spherical structures with diameters of 9.7 nm. It exhibits the lowest particle size due to its amorphous structure, as previously validated by the XRD data, and rather forms cluster aggregation with pore apertures in the 10 nm to 70 nm range. The HRTEM reveals several lattice planes associated with the α-Ag$_2$WO$_4$ phase, including (214), (361), (333). (402), and (214), as well as (005), (251), and (004) planes of β-Ag$_2$WO$_4$. The TEM morphological images, which show size and shape alterations after doping indicate that the doping process had an effect on the morphology of the particles. Due to aggregations of the doped structures, S-doped $Ag_2WO_4$ exhibited a variety of pore apertures in the mesopore range.

The EDX results for the elemental compositions of the AgW and S-doped AgW samples were studied, and it was observed that both the samples have minor peaks associated with the C and Br elements, which might be from a leftover CTAB template. The EDX of AgW reveals the presence of O, W, and Ag components. The S@AgW sample displays the same peaks linked to Ag, W, O, and C in addition to the appearance of peaks associated with N and S elements, a sign that S and N have been incorporated into the $Ag_2WO_4$ structure.

Figure 4A:
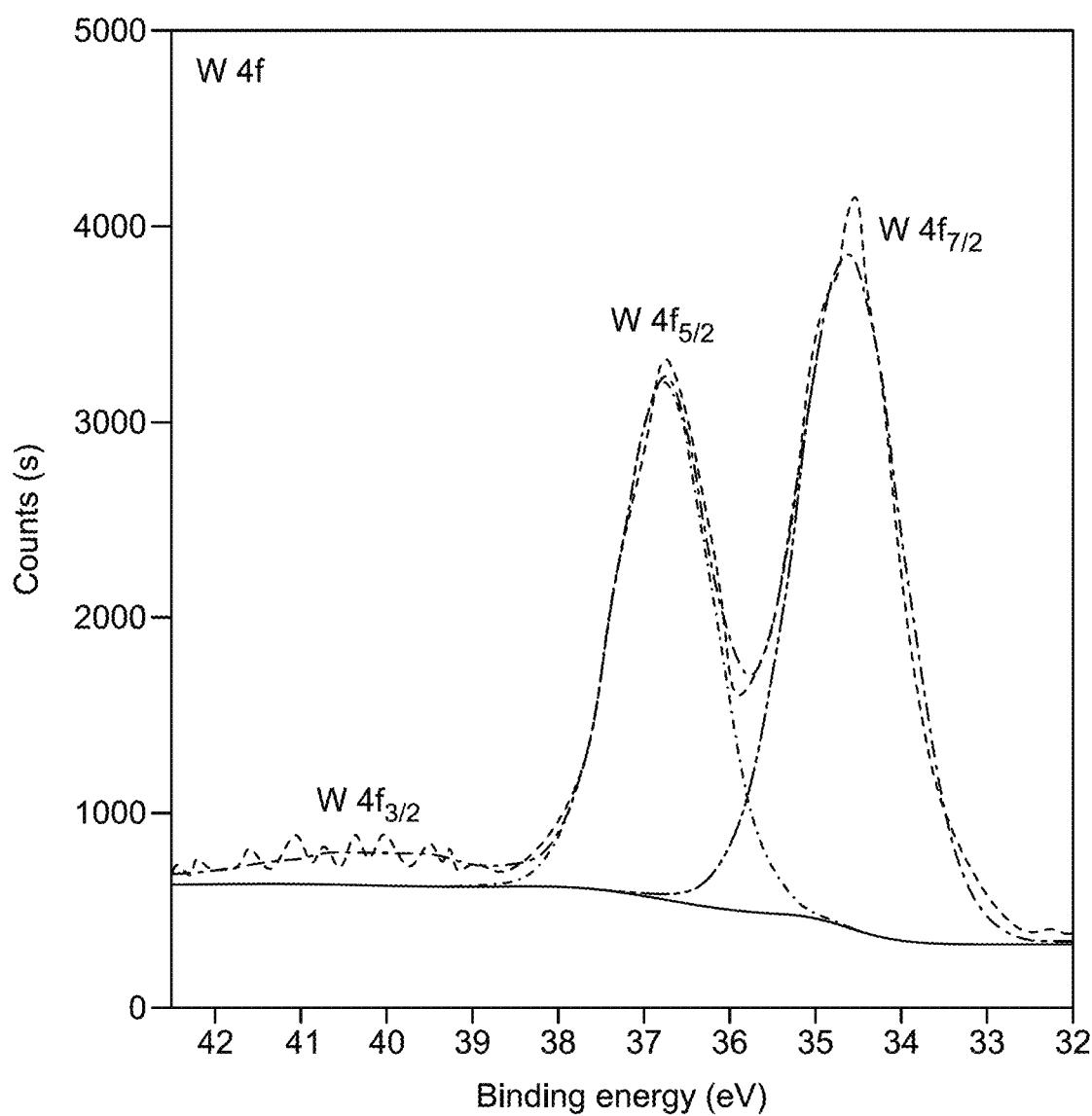
FIG. 4A depicts deconvoluted high-resolution X-ray photoelectron spectroscopy (XPS) spectra of W 4f of AgW, according to certain embodiments.
Figure 4B:
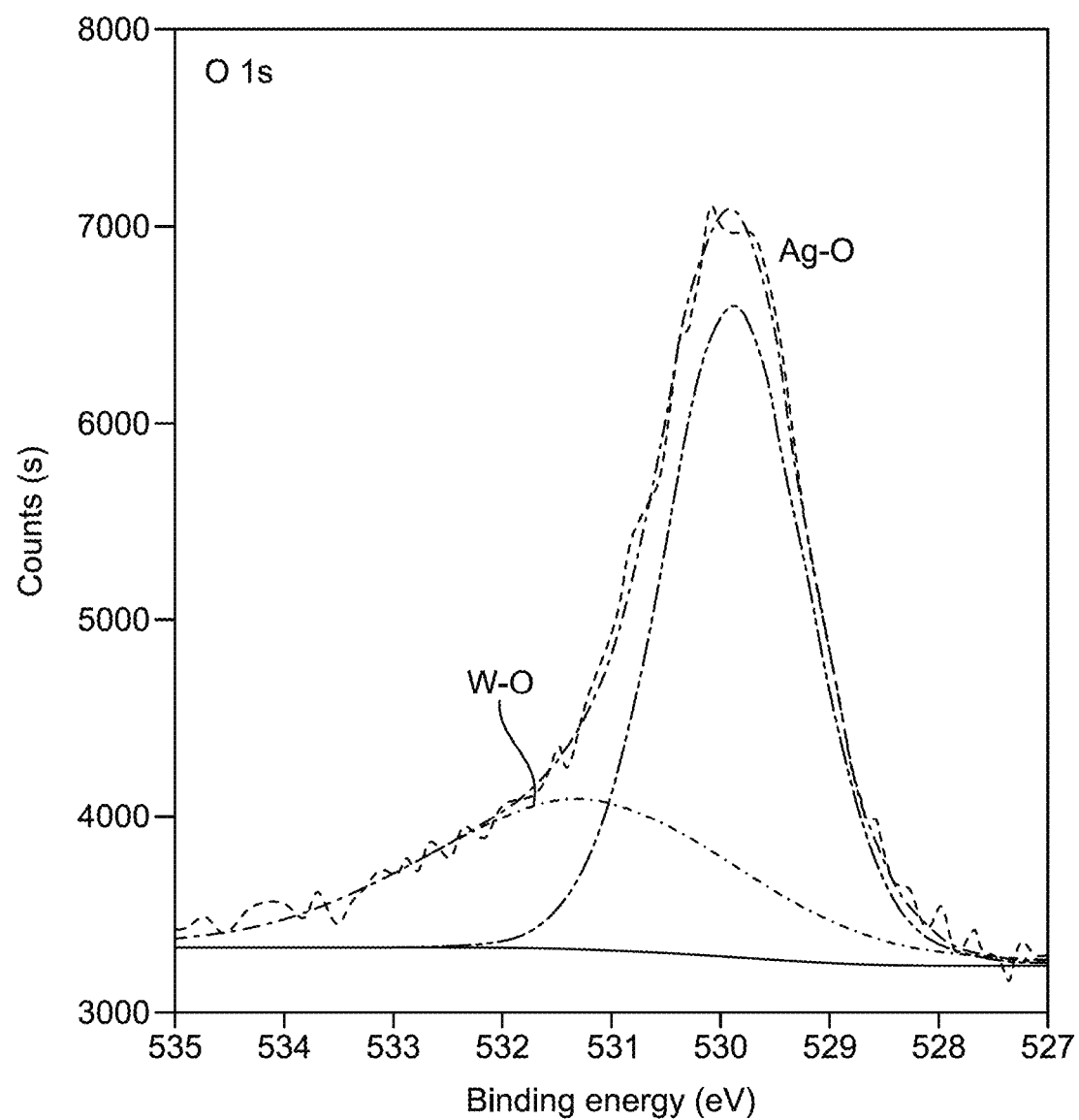
FIG. 4B depicts deconvoluted high-resolution XPS spectra of O 1s of AgW, according to certain embodiments.
Figure 4C:
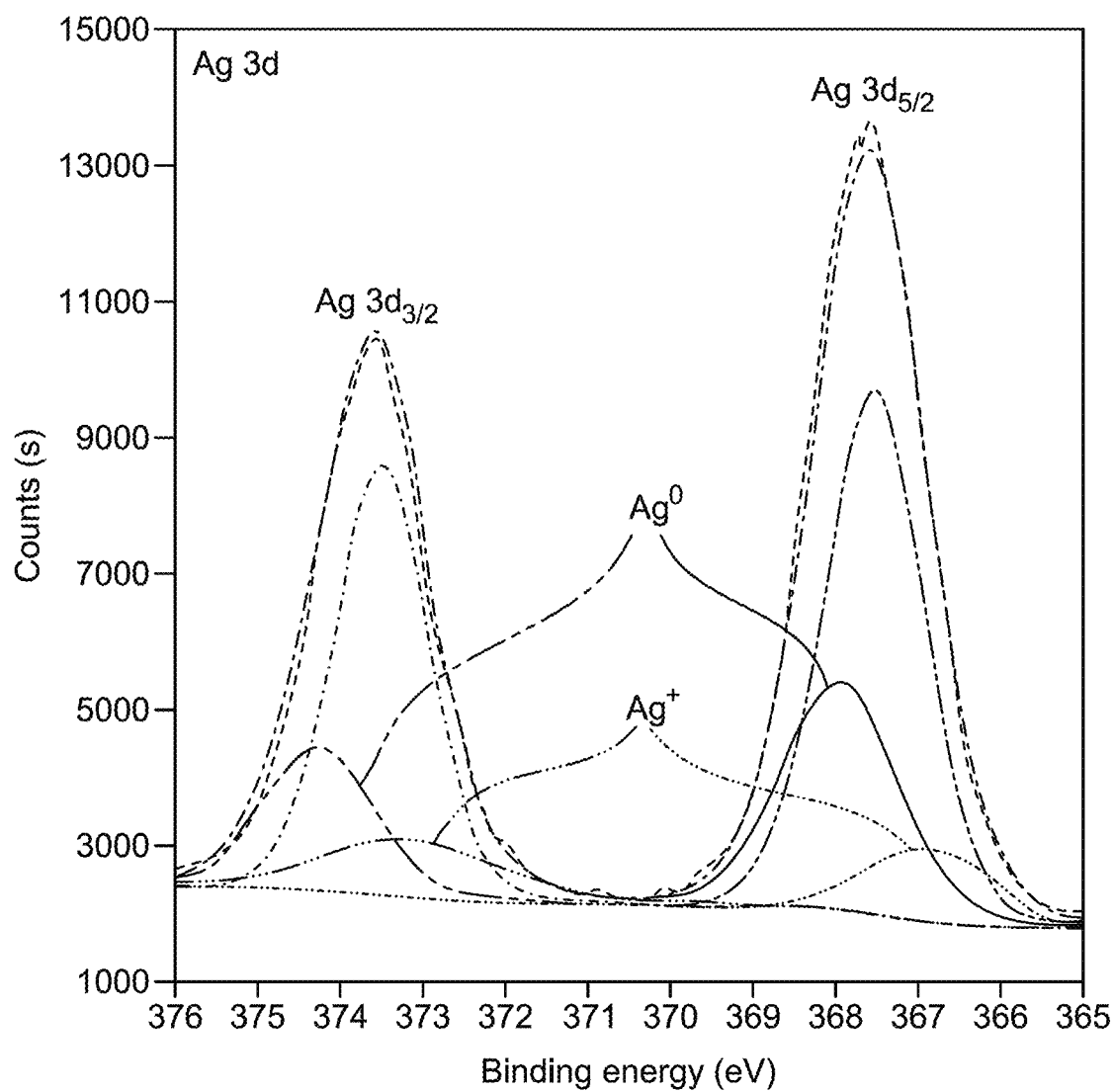
FIG. 4C depicts deconvoluted high-resolution XPS spectra of Ag 3d of AgW, according to certain embodiments.
Figure 4D:
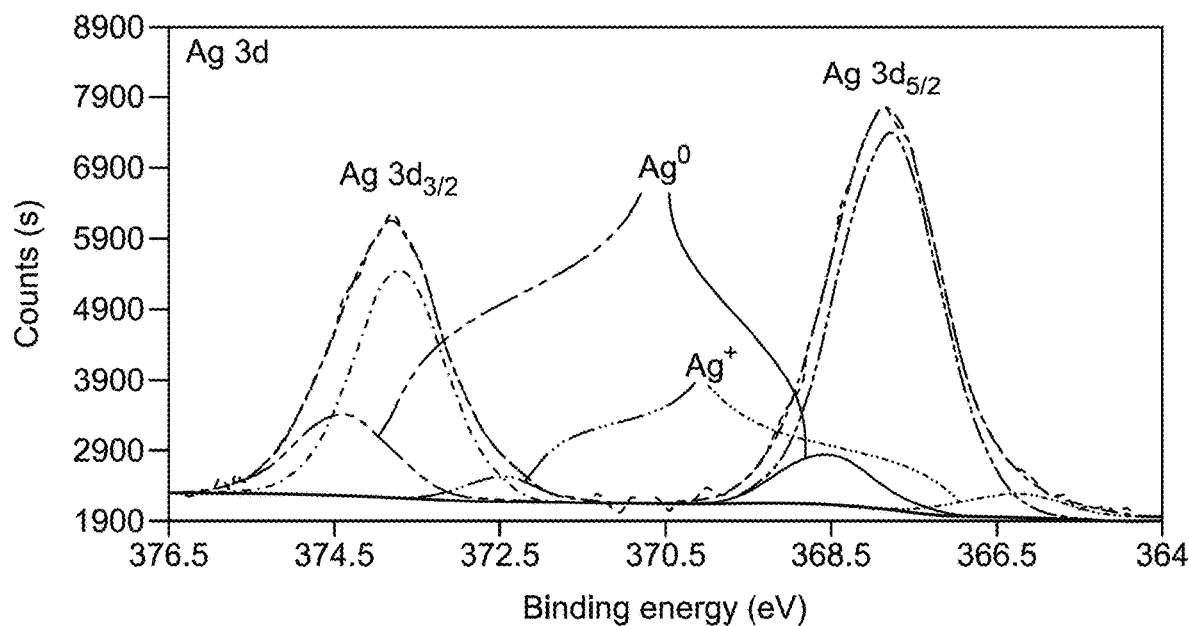
FIG. 4D depicts deconvoluted high-resolution XPS spectra of Ag 3d of S@AgW, according to certain embodiments.
Figure 4E:
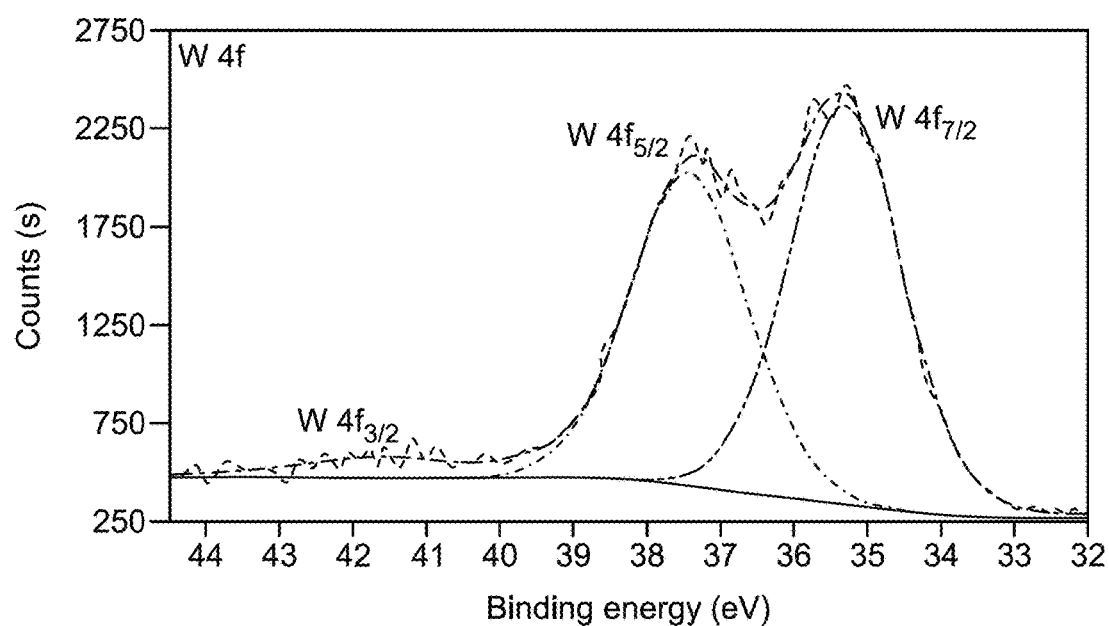
FIG. 4E depicts deconvoluted high-resolution XPS spectra of W 4f of S@AgW, according to certain embodiments.

An XPS analysis assessed the chemical components of AgW and B-doped AgW samples. The peaks of Ag, W, and O are seen in the XPS spectra of $\alpha$-$Ag_2WO_4$, as shown in FIGS. 4A-4C. Peaks at 34.8 electron volts (eV), 36.8 eV, and 40.2 eV associated with W4f 7/2, W4f 5/2, and W4f 3/2, respectively, are visible in the high-resolution W4f XPS spectra of the as-synthesized sample elaborating that $W^{6+}$ species may exist independently. Two peaks at 530.0 eV and 531.3 eV, which correspond to O1s generated via contacts with Ag—O and W—O, respectively, were seen in the deconvoluted XPS data for the O1s area, as shown in FIG. 4B. The occurrence of $Ag^+$ is indicated by the existence of two separate peaks in the Ag 3d spectra at 367.7 and 373.5 eV generated by Ag 3d5/2 and Ag 3d3/2. Results from deconvolution of the later peaks show that Ag nanoparticles are present, with a proportion of 31.1% relative to $Ag^+$, via peaks at 368.0 and 374.3 eV.

Figure 4F:
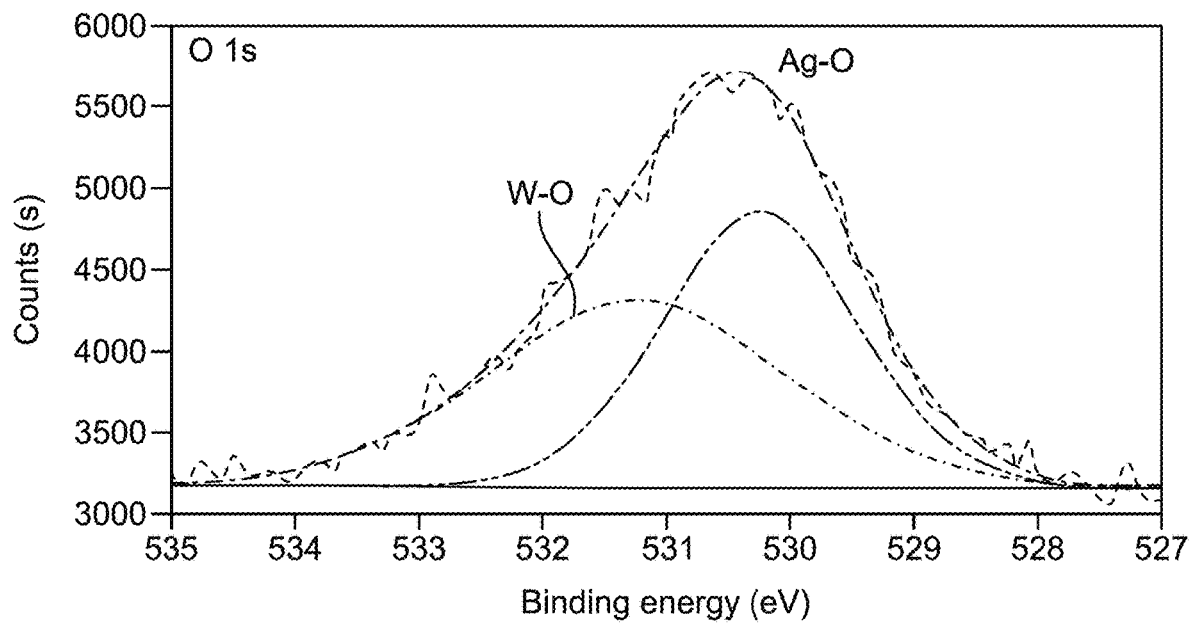
FIG. 4F depicts deconvoluted high-resolution XPS spectra of O 1s of S@AgW, according to certain embodiments.
Figure 4G:
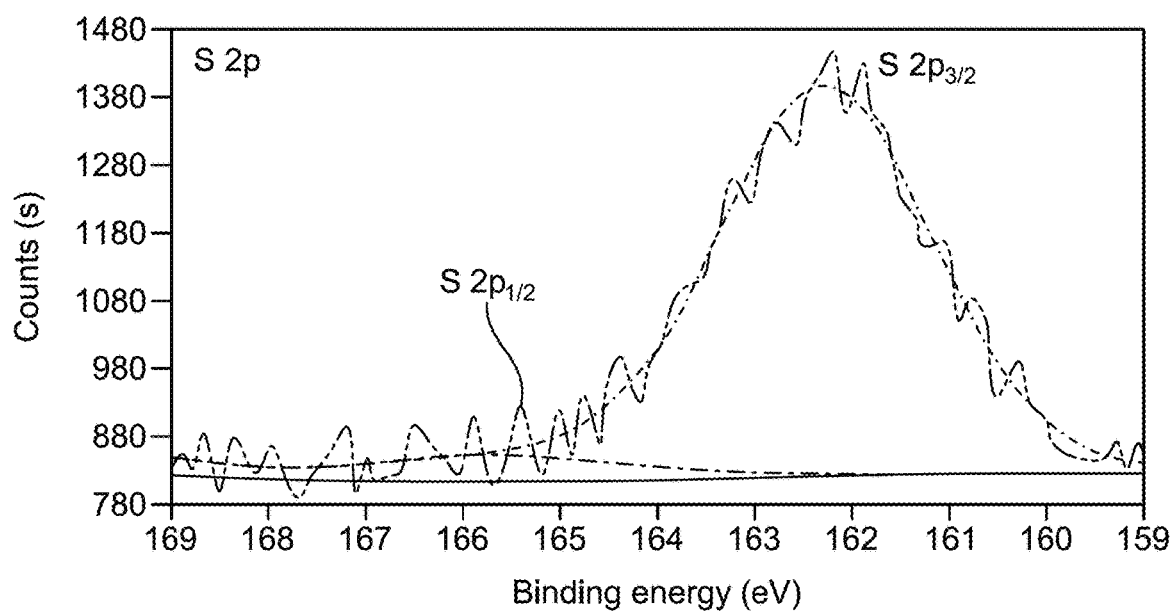
FIG. 4G depicts deconvoluted high-resolution XPS spectra of S 2p of S@AgW, according to certain embodiments.
Figure 4H:
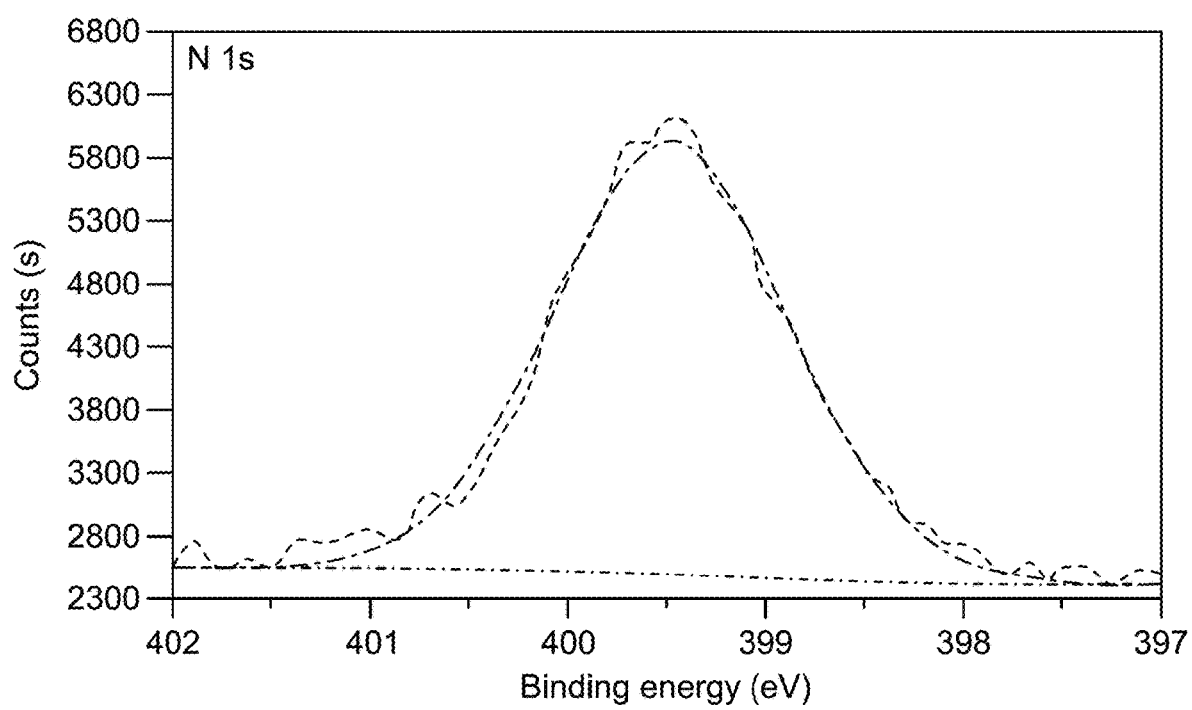
FIG. 4H depicts deconvoluted high-resolution XPS spectra of N 1s of S@AgW, according to certain embodiments.

The XPS analysis results of the S@AgW sample is shown in FIGS. 4D-4H, and the photoelectron peaks of the elements Ag, W, O, N and S are depicted, proposing that element N is certainly developed from CTAB modification. The Ag 3d exhibits two peaks at 368.55 eV and 372.52 eV due to $Ag^+$ species that are matching those seen in AgW with a slight shift to higher binding energies, demonstrating the arrangement of a robust heterojunction between AgW and S, which constitutes an amount made up of 14.3%. In a similar manner, the Ag nanoparticles are denoted by the two peaks at 366.27 eV and 374.39 eV, consisting of 13.01% relative to $Ag^+$. Peaks attributed to $W^{6+}$ (35.3 eV, 37.44 eV, and 41.23 eV) are detected at better binding energies compared to those observed for W in AgW (34.8 eV, 36.8 eV, and 40.2 eV). This is indicative of the strong interaction between S and AgW. Further, the O 1s XPS spectrum de-convoluted into two peaks at 530.24 eV and 531.24 eV attributed to Ag—O and W—O, respectively, as shown in FIG. 4F, further exceeding those comparable in AgW (529.88 eV and 531.20 eV). It may be attributed as a direct impact of the S involvement in the AgW structure. The S 2p XPS spectrum shows two peaks at 162.28 and 165.67 assigned to S 2p3/2 and S p1/2, as shown in FIG. 4G. The peak at 165.67 eV may also arise from the S in Ag—S—O. It may be noted from the XPS spectra of S@AgW that there was a peak at 399.48 eV that may be appointed to the N 1s species, specifying the existence of both N and S incorporated in the structure of $Ag_2WO_4$ in this specific sample. The presence of N atoms on the surface of S@AgW and the absence of such atoms in other doped AgW materials indicate that N may be found in bulk.

Figure 5:
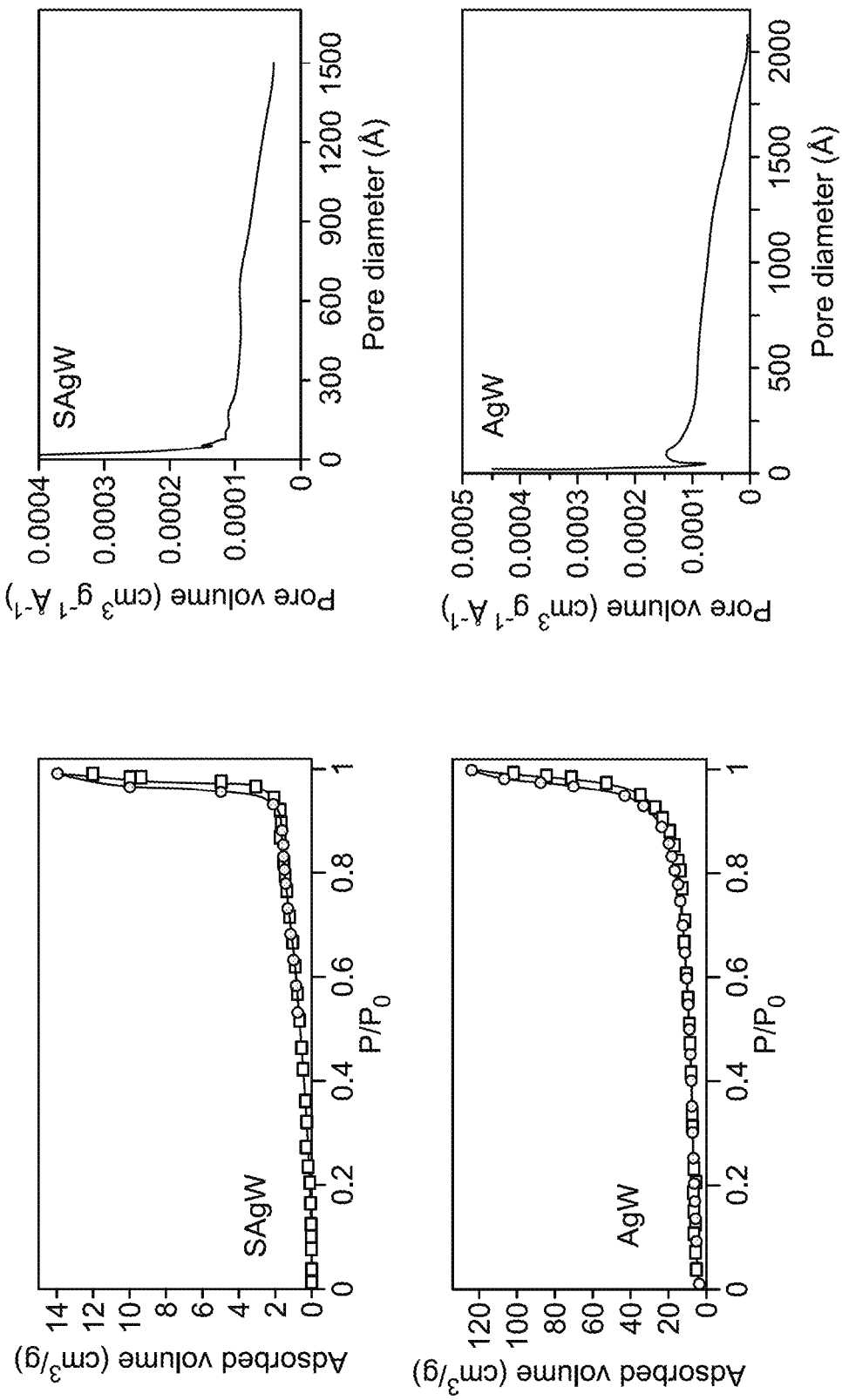
FIG. 5 shows $N_2$-adsorption-desorption isotherms and pore size distribution of AgW and S@AgW nanoparticles, according to certain embodiments.

The $N_2$ adsorption isotherms of AgW and S-doped AgW samples illustrated in FIG. 5 indicates a mixed-type I and II isotherm combining microporous and macroporous structures and are rather characterized by the H1 hysteresis loop. This type of H1 exhibits a narrow range of uniform mesopores, characterized by the ink-bottle type of pores. The CTAB-assisted AgW synthesis indicates the highest $S_{BET}$ and pore volume values (23.17 $m^2$/g, 0.19 cc/g) compared to SAgW (0.58 $m^2$/g, 0.021 cc/g). This could hint at the high possibility of the AgW sample's photocatalytic action. Contrarily, SAgW, which presented the lowest surface areas, displayed the highest pore radius value of 929 Å. This might give high accessibility to pollutant adsorption. According to the corresponding PSD curves, AgW has a noticeable peak at 150 Å, primarily representing the mesopores. The PSD curve of SAgW shows a main peak around 16 Å, characteristic of the microporosity. This microporosity might enhance adsorption according to the capillary condensation route.

Figure 6A:
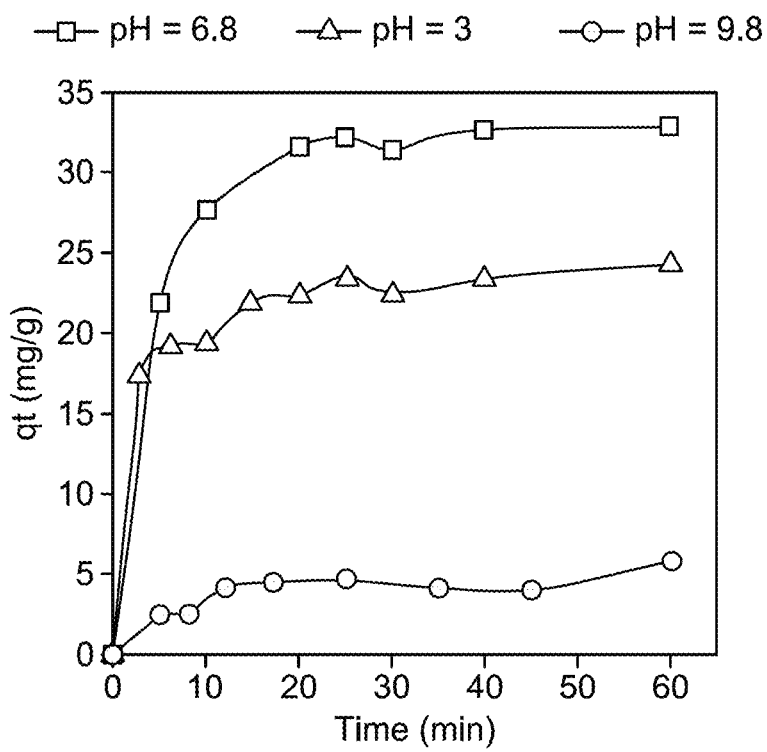
FIG. 6A shows the effect of pH on the adsorption capacity of the S@AgW toward indigo carmine (IC), according to certain embodiments.
Figure 6B:
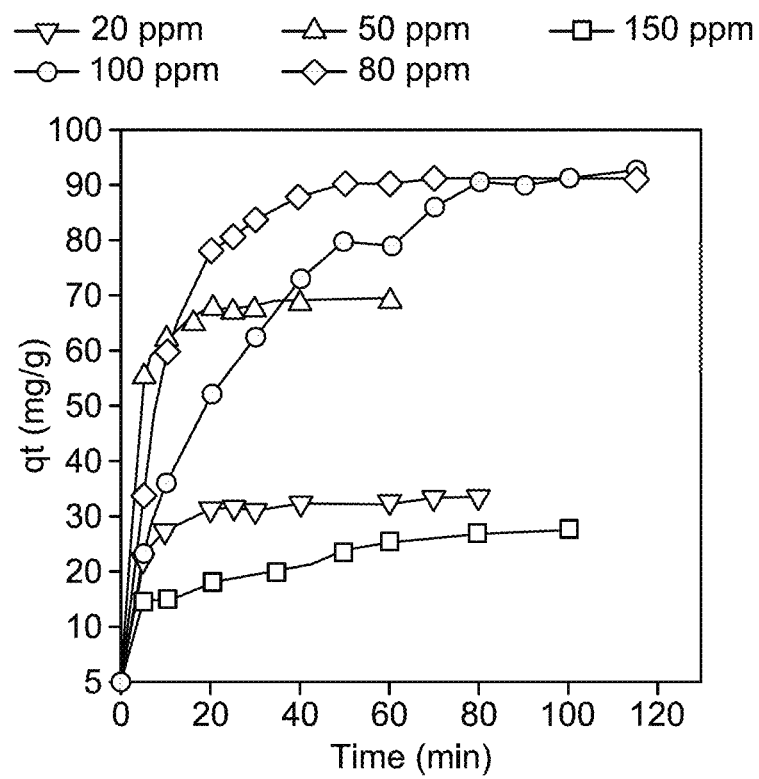
FIG. 6B shows the effect of IC initial concentration at pH 6.8 and at 30° C., according to certain embodiments.
Figure 6C:
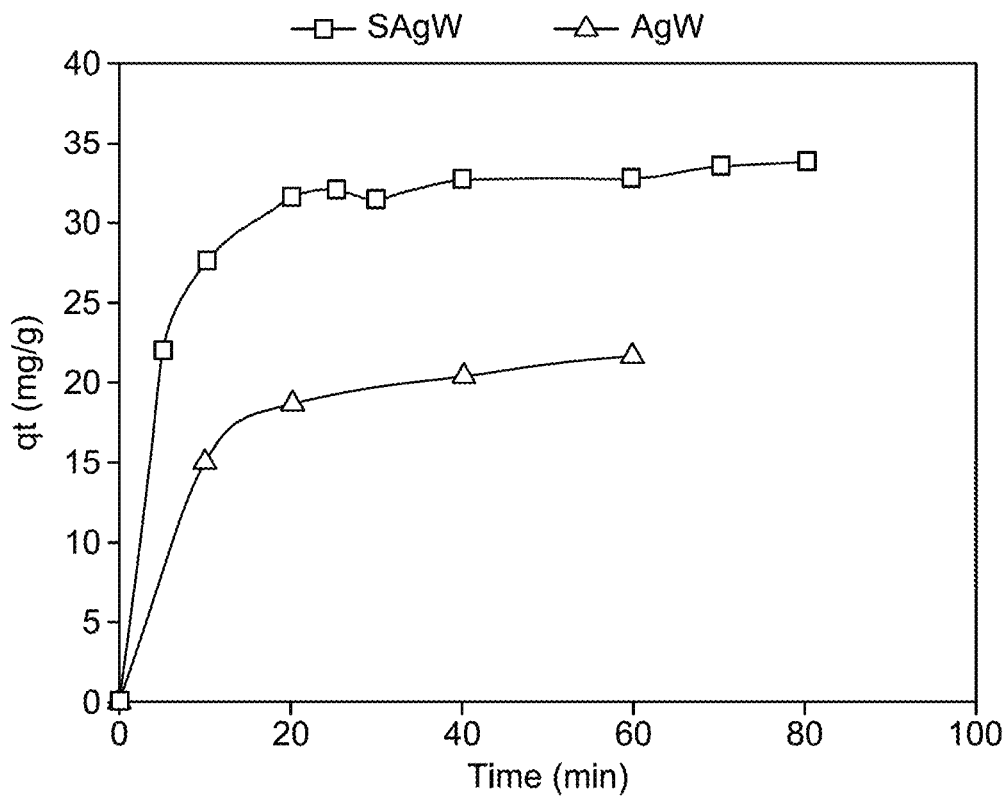
FIG. 6C and FIG. 6D show the effect of the duration of contact with AgW and S@AgW on the IC dye adsorption, according to certain embodiments.
Figure 6D:
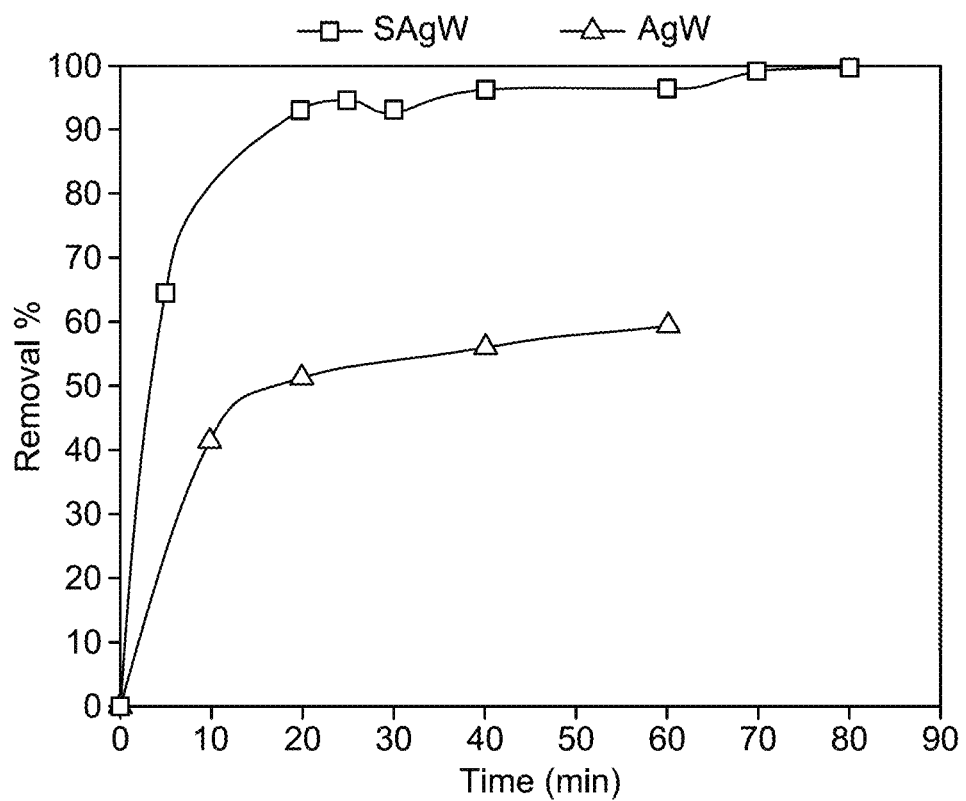

The best conditions for removing Indigo carmine (IC) dye with S@AgW nano-adsorbents were thoroughly investigated. Since the pH of the solute ions can alter the level of ionization and the charge on the adsorbent surface, pH variations are predicted to impact the adsorption of indigo carmine dye (IC). IC dye solution pH was measured at 3, 6.8, and 9.8. The highest adsorption effectiveness was at pH 6.8, as displayed in FIG. 6A, and it dropped as the pH rose. The observed zero-point charge of S@AgW was discovered at 7.9, indicating the positive nature of the catalyst surface. Low pH solutions boost the positive electrical charge on solution interfaces and the appearance of a positively charged adsorbent surface, promoting negatively charged IC dye adsorption. Since the initial IC dye concentration can have a substantial impact on the performance of the adsorbent, the initial IC dye concentration was changed from 20 to 150 mg/L, and the adsorption was carried out at an S@AgW dosage of 50 mg, 298 K temperature, and pH 6.8, as indicated in FIG. 6B. As the original dye concentration rises up to 120 mg $L^{-1}$, the proportion of dye removal intensifies as a result of an increase in the number of adsorbed dye molecules and the availability of more binding sites. In contrast, at higher concentrations (150 mg/L), the percentage of dye removal becomes low because the adsorption positions on the adsorbent surface are packed. At low concentrations, the adsorbent surface will have open, active sites, and when the initial dye concentration rises, the active sites needed for the adsorption process will be used up. FIG. 6C depicts the results of an investigation into the effect of contact time on dye removal for 90 min on all investigated samples. The removal of IC dye increased gradually over time until it reached equilibrium. The findings revealed that the dye removal improved with time and reached saturation after 20 min (FIG. 6D). It was shown that the SAgW had higher removal competence than the AgW. So, the adsorption process was carried out on SAgW. The results show that the IC sorption rate is largest within the initial 30 min of adsorption, which is attributed to the accessibility of active centers. The IC sorption rate then became resistant as the pores and active sites of the studied samples were exhausted. It also seems that exposing active sites such as N and S on the surface of SAgW boosts the IC adsorption and increases the pore radius (900 Å). Decreasing the particle size was another factor in facilitating reaching high-activity sites available for adsorption, besides its pore radius, which enabled much more adsorption comparatively, and the microporosity developed feature.

To investigate the IC dye removal process further, linear isotherm models, such as the Langmuir models, Freundlich, and Temkin models $$\frac{c_e}{q_e} = \frac{1}{q_{-a}K_L} + \frac{1}{q_{ma}}C_\varepsilon \qquad \text{(Eq. 3)}$$

-continued $$\ln q_e = \ln K_f - + \left(\frac{1}{n}\right) \ln C_e \quad \text{(Eq. 4)}$$

$$q_e = \left(\frac{RT}{b_T}\right) \ln A_T + \left(\frac{RT}{b_T}\right) \ln C_e \quad \text{(Eq. 5)}$$

Figure 7A:
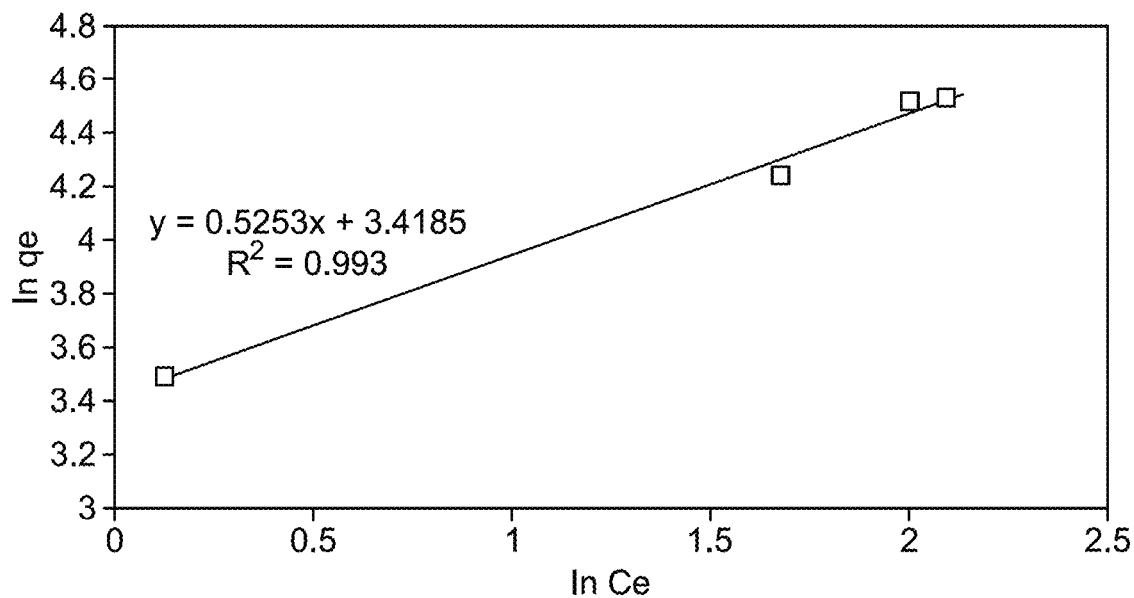
FIG. 7A-FIG. 7C show Freundlich isotherms, Langmuir isotherms, and Temkin isotherms, respectively, for IC dye adsorption onto SAgW adsorbent (pH 6.8, 1 g $L^{-1}$ of adsorbent dosage, 2 h shaking time, dye concentration is 20 mg $L^{-1}$, at 30° C.), according to certain embodiments.
Figure 7B:
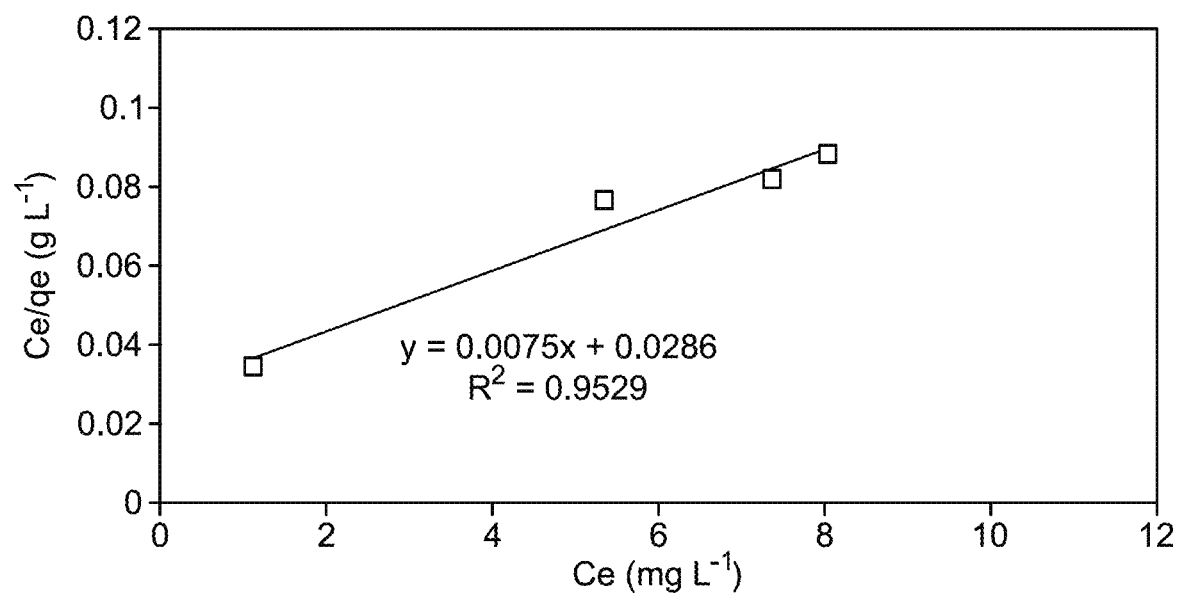
Figure 7C:
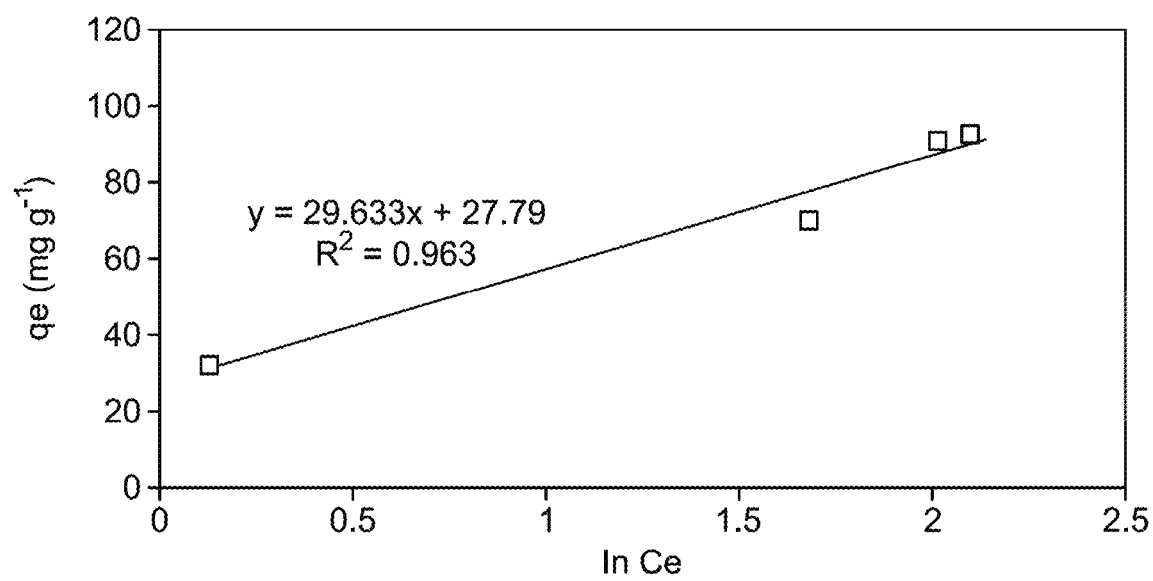

Their parameters were measured at pH 6.8, 1 g L$^{-1}$ of adsorbent dosage, 2 h shaking time, and a dye concentration of 20 mg L$^{-1}$ at 30° C. (FIG. 7A-FIG. 7C). The absorption results for the SAgW adsorbent show the highest correlation coefficient value (R$^2$=0.993) of the Freundlich approach (FIG. 7A) compared to the other isotherms (FIG. 7B and FIG. 7C). The capacity of absorption (qm) of the SAgW adsorbent for IC at 30° C. was 133.3 mg g$^{-1}$.

The rate of adsorption of the adsorbent was examined to explain the kinetics of IC dye absorption, as illustrated in FIG. 8A-8E. Once equilibrium was attained, the rate of IC dye absorption onto the SAgW adsorbent steadily decreased. After 20 min, considering the equilibrium time, there was a considerable increase in the elimination rate and maximum adsorption. The kinetics of the removal process are useful parameters for estimating adsorption dynamics. To analyze the outcomes of the experiment and determine the rate of IC dye absorption onto SAgW adsorbent, the pseudo-first-order (Eq. 6), pseudo-second-order (Eq. 7), second-order (Eq. 8), Elovich (Eq. 9) models were used as shown in FIG. 8A-FIG. 8E.

$$\ln(q_e - q_t) = \ln q_e - k_1 t \quad \text{(Eq. 6)}$$

$$\frac{t}{q_t} = \frac{1}{k_2 q_e^2} + \frac{t}{q_e} \quad \text{(Eq. 7)}$$

$$\frac{1}{(q_e - q_t)} = \frac{1}{q_e} + k_2 t \quad \text{(Eq. 8)}$$

$$q_t = \left(\frac{1}{\beta}\right) \ln(\alpha\beta) + \left(\frac{1}{\beta}\right) \ln t \quad \text{(Eq. 9)}$$

Figure 8A:
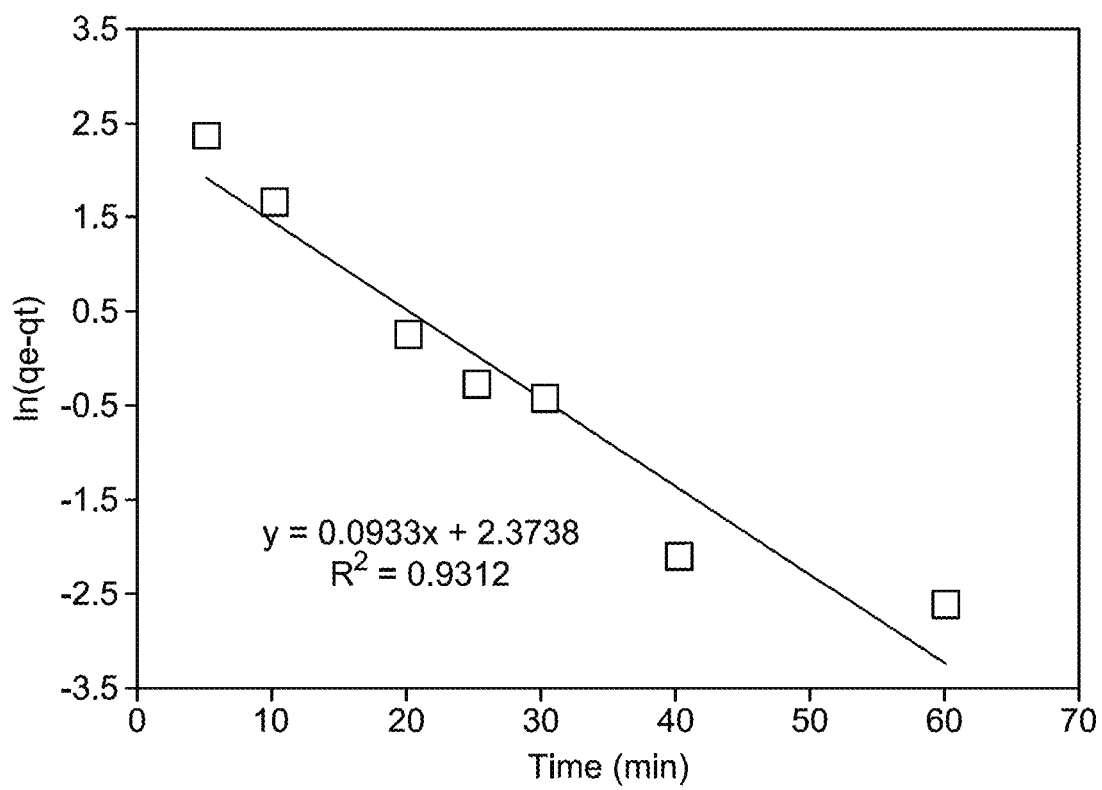
FIG. 8A shows pseudo-first-order plot for adsorption of IC dye on S@AgW adsorbents (pH 6.8, 1 g $L^{-1}$ of adsorbent dosage, 2 h shaking time, dye concentration is 20 mg $L^{-1}$, at 30° C.), according to certain embodiments.
Figure 8B:
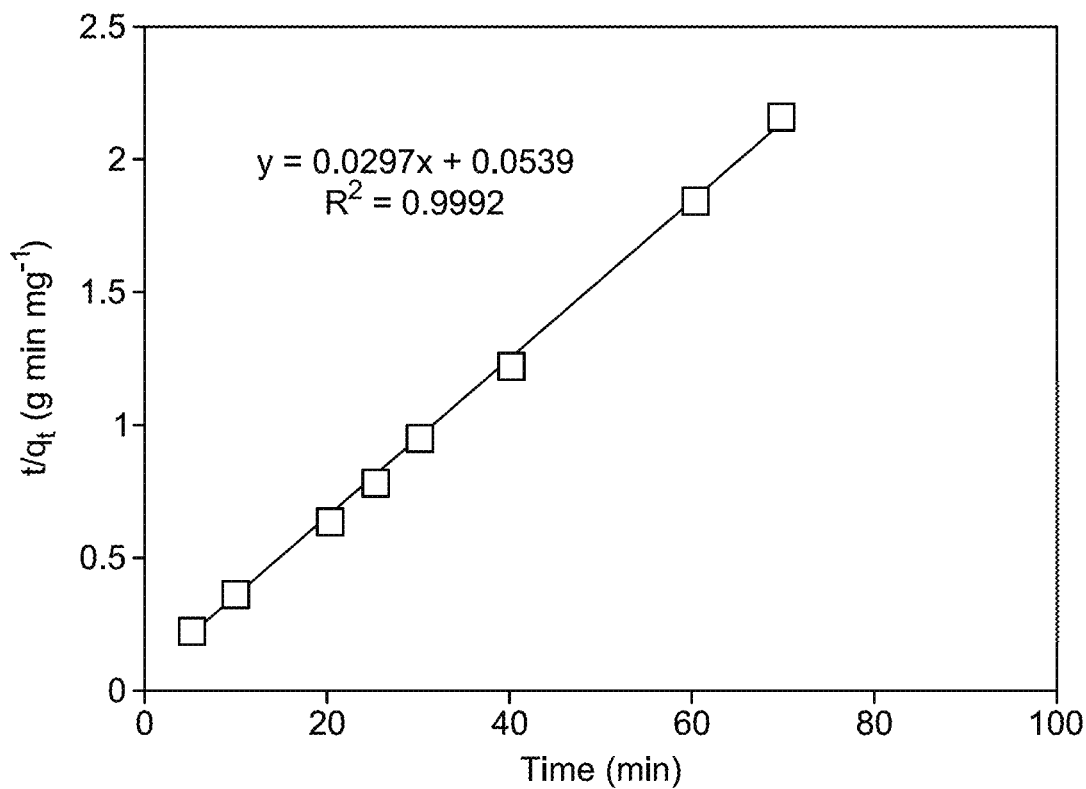
FIG. 8B shows pseudo-second-order plot for adsorption of IC dye on S@AgW adsorbents (pH 6.8, 1 g $L^{-1}$ of adsorbent dosage, 2 h shaking time, dye concentration is 20 mg $L^{-1}$, at 30° C.), according to certain embodiments.
Figure 8C:
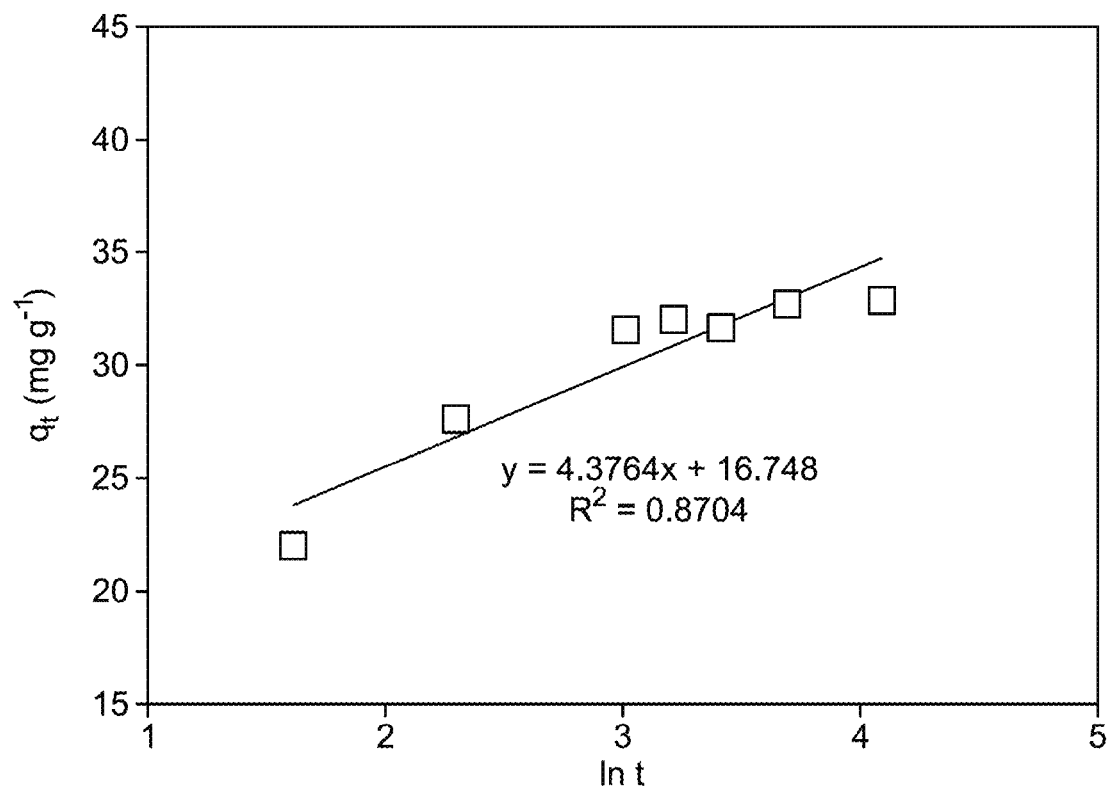
FIG. 8C shows second-order model for adsorption of IC dye on S@AgW adsorbents (pH 6.8, 1 g L$^{-1}$ of adsorbent dosage, 2 h shaking time, dye concentration is 20 mg L$^{-1}$, at 30° C.), according to certain embodiments.
Figure 8D:
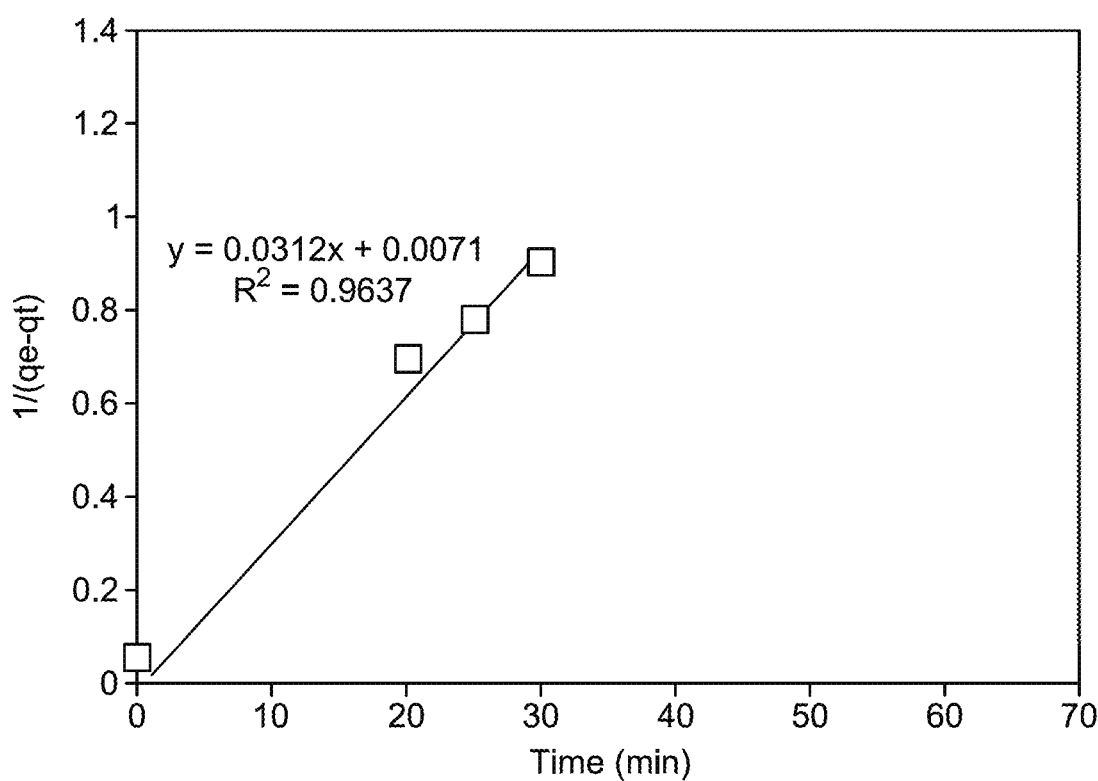
FIG. 8D shows Elovich model plot for adsorption of IC dye on S@AgW adsorbents (pH 6.8, 1 g L$^{-1}$ of adsorbent dosage, 2 h shaking time, dye concentration is 20 mg L$^{-1}$, at 30° C.), according to certain embodiments.

FIG. 8A shows the fitting of the pseudo-first-order with correlation coefficients (R$^2$) of 0.9312 which are lower than those of the pseudo-second-order model. The rate constant of pseudo-second order, k$_2$, was determined using t/qt versus t plots, and the adsorption capacity at equilibrium, q$_e$ cal, was calculated using the plot slope and intercept (FIG. 8B). The correlation coefficients achieved for all models were lower than the correlation coefficient obtained from the pseudo-second-order kinetic model. Furthermore, the R$^2$ values of the pseudo-second-order kinetic model (0.9992 for S@AgW) for IC dye were higher than those of the all-other kinetic models, inferring that the dye absorption kinetics follow the pseudo-second-order kinetic model. Adsorption of S@AgW is also influenced by electrostatic interactions, the quantity of active sites, and binding energies. Oppositely, the correlation coefficients of both the second-order model (FIG. 8C) and the Elovich model plots (FIG. 8D) show lower values than the pseudo-second-order.

The rate-determining step must be defined according to the kinetic outcomes of the adsorption process. The stage in the adsorption process that determines the rate may include intra-particle (pore) diffusion or the boundary layer (film). The improved Weber and Morries equation is used to study the intraparticle diffusion mechanism.

$$q_t = k_{dif}(t)^{0.5} + C \quad \text{(Eq. 10)}$$

Figure 8E:
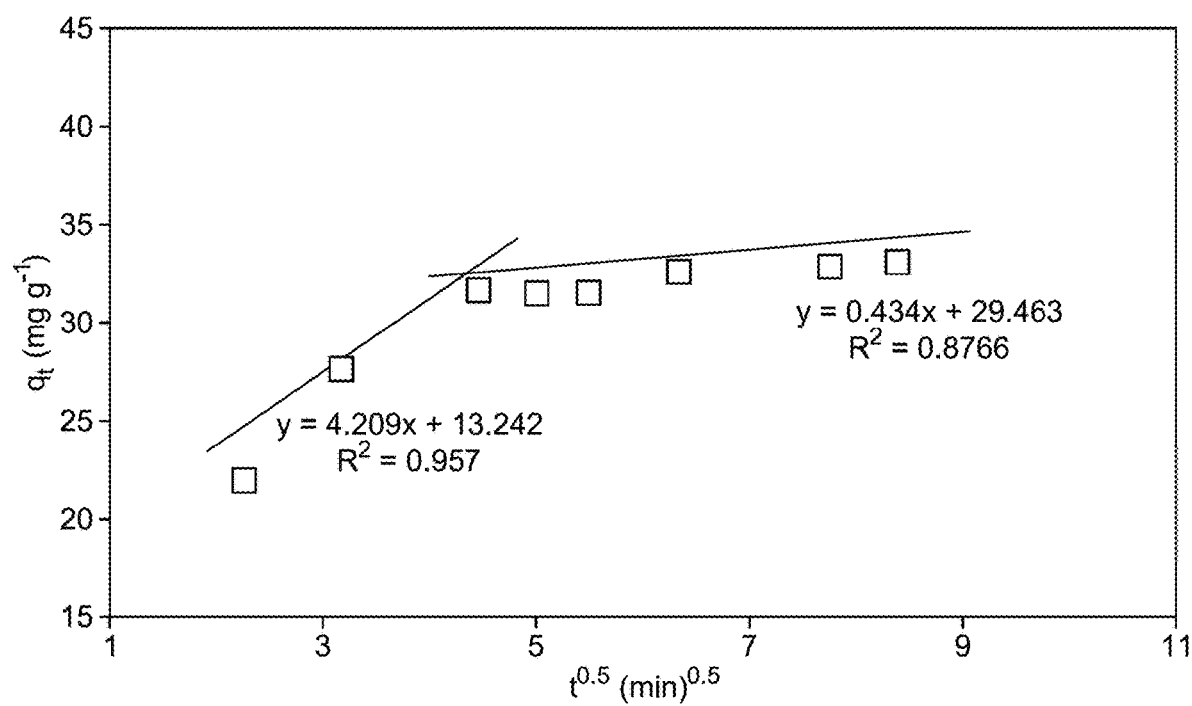
FIG. 8E shows intra-particle diffusion plots for adsorption of IC dye on S@AgW adsorbents (pH 6.8, 1 g L$^{-1}$ of adsorbent dosage, 2 h shaking time, dye concentration is 20 mg L$^{-1}$, at 30° C.), according to certain embodiments.

The removal of IC dye using SAgW adsorbents was studied from the slope of the corresponding initial linear region. The intraparticle diffusion mechanism of the adsorbent was examined (FIG. 8E). The intra-particle diffusion mechanism governs the procedure of adsorption if the graph of q$_t$ against t$^{0.5}$ yields only a single straight line; if the plot yields more than a single straight line, the absorption process is controlled by two or more phases. FIG. 10E illustrates how the plots of both specimens exhibit two straight-line phases. The model kinetic parameters have been determined, demonstrating that the first step's k$_1$ of SAgW (4.209 mg·min$^{-1/2}$ g$^{-1}$) is greater than the second step's k2 of SAgW (0.434 mg·min$^{-1/2}$ g$^{-1}$. Only intraparticle diffusion governs adsorption if the plot of qt against t0.5 is a straight line. Nonetheless, it indicates that two phases affect adsorption if fitting yields two linear plots. Surface and intraparticle diffusion are two phases that appear to impact the process (FIG. 8E). The initial phase shows the IC's diffusion to the adsorbent's outside surface. The adsorption rate at this stage is larger, as evidenced by the slope's greater value. Compared to the first stage, the second stage has a lower slope. This indicates that one of the rate-limiting steps is intraparticle diffusion. These results all indicate that the adsorption of the organic dye onto S@AgW is controlled by external mass transfer followed by intraparticle diffusion mass transfer. In an acidic medium, S@AgW adsorbent demonstrated a high capacity for IC dye adsorption. The highly charged S@AgW, in addition to the hollow structure of the β-form of Ag$_2$WO$_4$, was the cause of the increased adsorption efficiency in a strongly acidic environment. These findings indicate that S@AgW is a particularly effective adsorbent for the adsorption of anionic dyes.

Figure 9A:
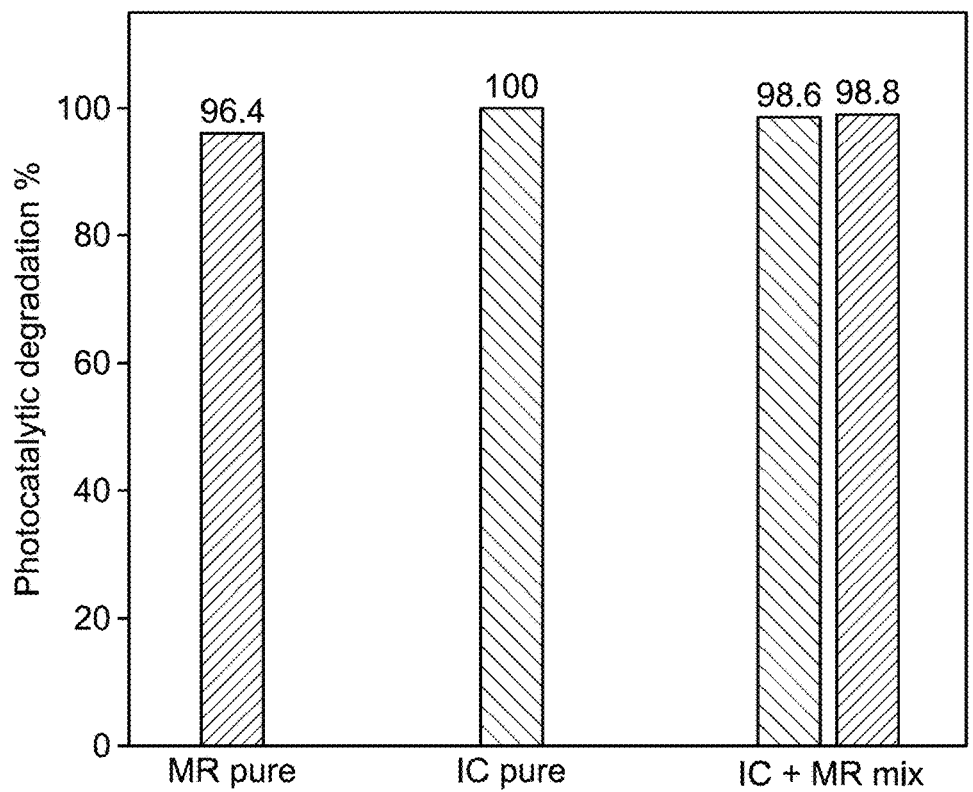
FIG. 9A shows the removal efficiency of pure IC and methyl red (MR) dyes as well as their mixture removal efficiencies using S@AgW (pH 6.8, 1 g L$^{-1}$ of adsorbent dosage, 2 h shaking time, IC and MR dye concentration is 20 mg L$^{-1}$, at 30° C.), according to certain embodiments.
Figure 9B:
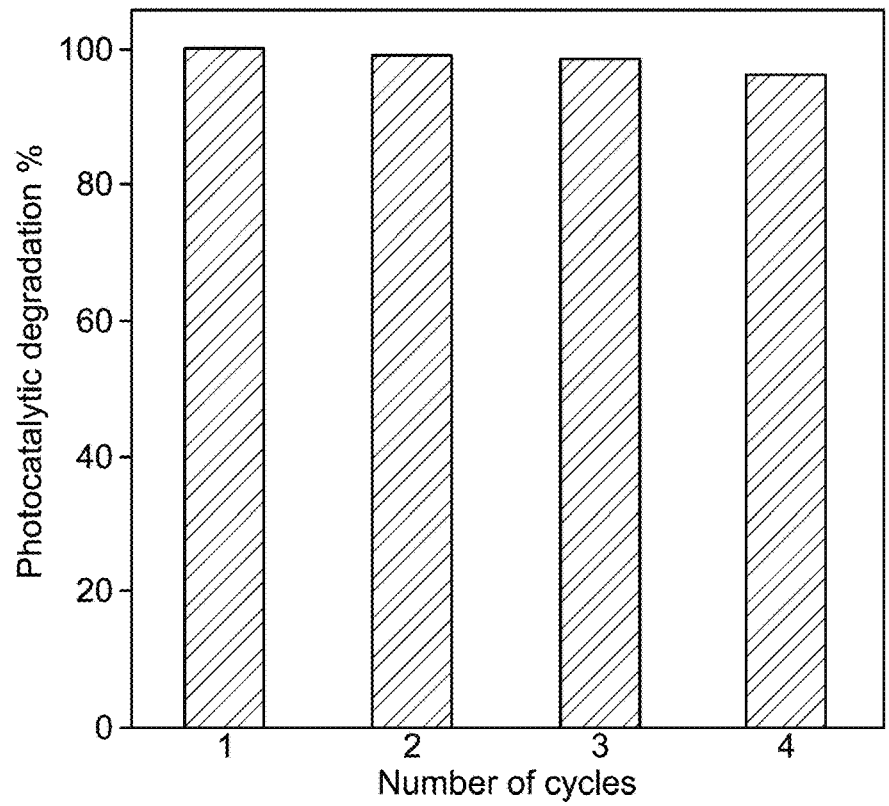
FIG. 9B shows the reusability of S@AgW photocatalyst (pH 6.8, 1 g L$^{-1}$ of adsorbent dosage, 2 h shaking time, IC and MR dye concentration is 20 mg L$^{-1}$, at 30° C.), according to certain embodiments.

S@AgW adsorbent was used to test the careful trapping and capture of IC dye in the presence of another common anionic dye, such as methyl red dye (MR) (FIG. 9A). The removal of MR was done separately at the same optimum conditions. It showed a removal percentage of 96.4%. At optimal experimental circumstances (i.e., IC dye concentration, 20 mg/L; volume of IC solution, 50 ml; S@AgW dose, 0.05 g; pH, 6.8; temperature, 30° C.), the effects of co-existing anionic MR dye were examined. There was no influence on the adsorption of MR anionic dye while adsorbing IC, approaching ~98% for both removals.

Cost-effective adsorbents can be used several times while maintaining their ability to remove dye, separate particles, and recover after regeneration. Following washing with a solution of 0.1 M HCl, the extraction (collection) of IC dye captured by the S@AgW absorbent was evaluated. The capacity to be reused is a fundamental characteristic of any porous material useful for various applications. After four consecutive adsorption-desorption series, a slight change was observed in the S@AgW adsorption capacity. Desorption frequently occurs in straightforward conditions. To regenerate the tested S@AgW sorbent (i.e., IC dye-loaded adsorbent), 0.02 g of the absorbent was placed in a flask and repeatedly meticulously washed with 0.1 M HCl until the pH of the washing solution approached 7. After that, distilled water was used to rinse the adsorbent repeatedly. Utilizing ethanol, the residual colors in the absorbent material were removed. The clean absorbent was gathered and roasted for four hours at 60° C. The following dye adsorption test made use of the regenerated adsorbent. Following each adsorption and desorption cycle, the adsorbent regeneration effectiveness was found to be 92.5% following the fourth cycle (FIG. 913). The slight decline in regeneration effectiveness may be brought on by an obstruction of the S@AgW adsorption site and likely pore apertures.

The present disclosure provides the method for water decontamination using S@AgW nanoparticles. In addition, the present disclosure further describes methods and techniques for the synthesis of S@AgW nanoparticles. As such, a one-step precipitation approach is described to synthesize pure and S-doped $Ag_2WO_4$ (AgW) with the aid of a cetyltrimethylammonium bromide (CTAB) template to develop catalytic materials with components and architectures that tolerate harsh conditions. The prepared samples were characterized via spectroscopy-microscopy techniques (XRD, IR, XPS, and TEM) and electrochemical workstations (EIS, CV, Tafel plots, LSV, and chronoamperometry). The doping with sulfur has a huge effect on the crystallinity and results in an amorphous structure of $Ag_2WO_4$ that is mostly configured as a β-form $Ag_2WO_4$. The S@AgW images show spherical particles with spherical structures with diameters of 9.7 nm, which has a quick adsorption rate towards both methyl red and indigo carmine dyes, with a rate of elimination of up to 98.7% and an adsorbent regeneration efficacy of 92.5% after four cycles. The adsorption dynamics of the indigocarmine dye are adequately explained by the pseudo-second-order kinetic mode, and the adsorption isotherm is totally matched to the Freundlich model.

Numerous modifications and variations of the present disclosure are possible in light of the above teachings. It is therefore to be understood that within the scope of the appended claims, the invention may be practiced otherwise than as specifically described herein.

The invention claimed is:

1. A method of water decontamination, comprising:
   contacting sulfur-doped $Ag_2WO_4$ nanoparticles with an aqueous solution to form a mixture, wherein the aqueous solution comprises one or more pollutants,
   mixing the mixture; and
   collecting a filtrate, wherein the filtrate has less of the one or more pollutants than the aqueous solution,
   wherein the amount of sulfur present in the sulfur-doped $Ag_2WO_4$ nanoparticles is in a range from 5 to 30 wt. % of the total weight of the sulfur-doped $Ag_2WO_4$ nanoparticles, and
   wherein the sulfur-doped $Ag_2WO_4$ nanoparticles have an average particle diameter ranging from 2 to 40 nm.

2. The method of claim 1, wherein the sulfur-doped $Ag_2WO_4$ nanoparticles are amorphous when examined by X-ray diffraction.

3. The method of claim 1, wherein the amount of sulfur present in the sulfur-doped $Ag_2WO_4$ nanoparticles is in a range from 10 to 25 wt. % of the total weight of the sulfur-doped $Ag_2WO_4$ nanoparticles.

4. The method of claim 3, wherein the amount of sulfur present in the sulfur-doped $Ag_2WO_4$ nanoparticles is in a range from 13 to 22 wt. % of the total weight of the sulfur-doped $Ag_2WO_4$ nanoparticles.

5. The method of claim 1, wherein the sulfur-doped $Ag_2WO_4$ nanoparticles have an indigo carmine dye adsorption capacity of greater than or equal to 30 qt (mg/g), the mixture is mixed for 60 minutes, and the pH of the aqueous solution is in a range from 6 to 8.

6. The method of claim 5, wherein the starting concentration of indigo carmine dye is in a range from 95 to 105 ppm.

7. The method of claim 1, wherein the sulfur-doped $Ag_2WO_4$ nanoparticles have an indigo carmine dye adsorption capacity of greater than or equal to 20 qt (mg/g), the mixture is mixed for 60 minutes, and the pH of the aqueous solution is in a range from 2 to 5.

8. The method of claim 1, wherein the sulfur-doped $Ag_2WO_4$ nanoparticles have an indigo carmine dye adsorption capacity of greater than or equal to 3 qt (mg/g), the mixture is mixed for 60 minutes, and the pH of the aqueous solution is in a range from 9 to 11.

9. The method of claim 1, wherein the sulfur-doped $Ag_2WO_4$ nanoparticles have an indigo carmine dye adsorption capacity of greater than or equal to 25 qt (mg/g), the mixture is mixed for 10 minutes, and the pH of the aqueous solution is in a range from 6 to 8.

10. The method of claim 1, wherein the sulfur-doped $Ag_2WO_4$ nanoparticles have an indigo carmine dye adsorption capacity of greater than or equal to 32 qt (mg/g), the mixture is mixed for 80 minutes, and the pH of the aqueous solution is in a range from 6 to 8.

11. The method of claim 1, wherein the sulfur-doped $Ag_2WO_4$ nanoparticles have an indigo carmine dye removal efficiency of greater than or equal to 95%, the mixture is mixed for 80 minutes, and the pH of the aqueous solution is in a range from 6 to 8.

12. The method of claim 1, wherein the sulfur-doped $Ag_2WO_4$ nanoparticles have an indigo carmine dye adsorption capacity of greater than or equal to 25 qt (mg/g), the mixture is mixed for 60 minutes, the pH of the aqueous solution is in a range from 6 to 8, and the starting concentration of indigo carmine dye is in a range from 15 to 25 ppm.

13. The method of claim 1, wherein the sulfur-doped $Ag_2WO_4$ nanoparticles have an indigo carmine dye adsorption capacity of greater than or equal to 60 qt (mg/g), the mixture is mixed for 60 minutes, the pH of the aqueous solution is in a range from 6 to 8, and the starting concentration of indigo carmine dye is in a range from 45 to 55 ppm.

14. The method of claim 1, wherein the sulfur-doped $Ag_2WO_4$ nanoparticles have an indigo carmine dye adsorption capacity of greater than or equal to 80 qt (mg/g), the mixture is mixed for 60 minutes, the pH of the aqueous solution is in a range from 6 to 8, and the starting concentration of indigo carmine dye is in a range from 75 to 85 ppm.

15. The method of claim 1, wherein the sulfur-doped $Ag_2WO_4$ nanoparticles have an indigo carmine dye adsorption capacity of greater than or equal to 20 qt (mg/g), the mixture is mixed for 60 minutes, the pH of the aqueous solution is in a range from 6 to 8, and the starting concentration of indigo carmine dye is in a range from 145 to 155 ppm.

16. The method of claim 1, wherein the sulfur-doped $Ag_2WO_4$ nanoparticles are reusable after undergoing a regeneration cycle comprising washing the sulfur-doped $Ag_2WO_4$ nanoparticles with 0.1 M HCl and then rinsing the sulfur-doped $Ag_2WO_4$ nanoparticles with water.

17. The method of claim 16, wherein the sulfur-doped $Ag_2WO_4$ nanoparticles have an indigo carmine dye removal efficiency of greater than or equal to 90% after 3 regeneration cycles.

18. The method of claim 1, wherein the sulfur-doped $Ag_2WO_4$ nanoparticles have a methyl red dye adsorption removal efficiency of greater than or equal to 90%.

19. The method of claim 1, wherein the sulfur-doped $Ag_2WO_4$ nanoparticles have an indigo carmine dye removal efficiency and a methyl red dye adsorption removal efficiency both greater than or equal to 90%, wherein the starting concentration of indigo carmine dye is 20 ppm and the starting concentration of methyl red dye is 20 ppm.

20. The method of claim 1, wherein the temperature of the aqueous solution is in a range from 20 to 40° C.

* * * * *